United States Patent [19]
Trandal et al.

[11] Patent Number: 6,088,428
[45] Date of Patent: Jul. 11, 2000

[54] VOICE CONTROLLED MESSAGING SYSTEM AND PROCESSING METHOD

[75] Inventors: David Trandal; David Brahm; Jan Vanderford; R. Anthony Bladon, all of Santa Barbara; Xiao-Ling Zhang, Goleta, all of Calif.

[73] Assignee: Digital Sound Corporation, Carpinteria, Calif.

[21] Appl. No.: 08/955,578

[22] Filed: Oct. 22, 1997

Related U.S. Application Data

[63] Continuation of application No. 08/358,971, Oct. 19, 1994, abandoned, which is a continuation of application No. 07/815,411, Dec. 31, 1991, abandoned.

[51] Int. Cl.[7] .............................. H04M 1/66; H04M 3/50
[52] U.S. Cl. .................................... 379/88.02; 379/88.03; 379/88.04; 379/189; 704/246; 704/257
[58] Field of Search ............................. 379/88.02, 88.03, 379/88.04, 84, 213, 214, 216, 74, 76, 245, 246, 142, 189, 196, 197, 198; 704/246, 247, 251, 255, 256

[56] References Cited

U.S. PATENT DOCUMENTS

| | | |
|---|---|---|
| 4,076,960 | 2/1978 | Buss et al. . |
| 4,227,177 | 10/1980 | Moshier ............................... 340/146.3 |
| 4,264,959 | 4/1981 | Blaäss ..................................... 364/487 |
| 4,371,752 | 2/1983 | Matthews et al. . |
| 4,415,767 | 11/1983 | Gill et al. ................................. 381/45 |
| 4,757,525 | 7/1988 | Matthews et al. ....................... 379/89 |
| 4,761,807 | 8/1988 | Matthews et al. ....................... 379/89 |
| 4,829,574 | 5/1989 | Dewhurst et al. ....................... 381/41 |
| 4,837,804 | 6/1989 | Akita ......................................... 379/88 |
| 4,850,005 | 7/1989 | Hashimoto ............................... 379/51 |
| 4,852,172 | 7/1989 | Taguchi .................................... 381/43 |
| 4,853,952 | 8/1989 | Jachmann et al. ....................... 379/88 |
| 4,853,953 | 8/1989 | Fujisaki .................................... 379/88 |
| 4,876,717 | 10/1989 | Barron et al. ............................. 380/25 |
| 4,896,346 | 1/1990 | Belfield et al. ........................... 379/88 |
| 4,903,305 | 2/1990 | Gillick et al. ............................. 381/41 |
| 4,922,538 | 5/1990 | Tchorzewski ............................. 381/42 |
| 4,949,379 | 8/1990 | Cordell ........................................ 380/9 |
| 4,974,191 | 11/1990 | Amirghodsi et al. ................... 364/900 |
| 4,989,249 | 1/1991 | Oka et al. ................................. 381/43 |
| 4,996,707 | 2/1991 | O'Malley et al. ...................... 379/100 |

(List continued on next page.)

FOREIGN PATENT DOCUMENTS

| | | |
|---|---|---|
| 0045941 | 2/1982 | European Pat. Off. . |
| 298621 | 1/1989 | European Pat. Off. . |
| 370662 | 5/1990 | European Pat. Off. . |

OTHER PUBLICATIONS

B.S. Atal, "Effectiveness of linear prediction characteristics of the speech wave for automatic speaker identification and verification", J. Acoust. Soc. Am., vol. 55, No. 6, Jun. 1974, pp. 1304–1312.

(List continued on next page.)

*Primary Examiner*—Fan S. Tsang
*Attorney, Agent, or Firm*—Christie, Parker & Hale, LLP

[57] ABSTRACT

A voice controlled voice-messaging systems permits manipulation of voice messages over the telephone without the need for keypressed commands. Manipulation includes playback of messages, deletion of messages, saving messages, and sending a new message to a recipient from a user-defined list. Access to the messaging system is by spoken password. Voice input also allows the following functions: enrollment of a spoken password; granting or refusing user access to the system based on verification of the user speaking a password; recognition of spoken utterances of "yes" and "no" in response to prompts by the VMS; recognition of "stop" to interrupt and stop a voice message during playback; enrollment of a spoken personal directory of names of potential message recipients; and recognition of names in the spoken personal directory. The invention uses speaker verification, speaker-independent recognition (SIR) of "yes/no", speaker-independent recognition of "stop" during message playback, and speaker-dependent recognition (SDR) of a limited vocabulary of short phrases such as a list of message recipients' names.

49 Claims, 26 Drawing Sheets

U.S. PATENT DOCUMENTS

| | | | |
|---|---|---|---|
| 5,033,088 | 7/1991 | Shipman | 381/43 |
| 5,036,539 | 7/1991 | Wrench, Jr. et al. | 381/43 |
| 5,046,099 | 9/1991 | Nishimura | 381/43 |
| 5,048,074 | 9/1991 | Dugdale | 379/67 |
| 5,050,206 | 9/1991 | Shimanuki | 379/67 |
| 5,050,215 | 9/1991 | Nishimura | 381/41 |
| 5,054,061 | 10/1991 | Yoshida | 379/390 |
| 5,054,074 | 10/1991 | Bakis | 381/41 |
| 5,056,143 | 10/1991 | Taguchi | 381/35 |
| 5,056,150 | 10/1991 | Yu et al. | 381/43 |
| 5,058,166 | 10/1991 | Ney et al. | 381/43 |
| 5,058,167 | 10/1991 | Kimura | 381/43 |
| 5,072,452 | 12/1991 | Brown et al. | 381/43 |
| 5,121,428 | 6/1992 | Uchiyama et al. | 381/42 |
| 5,127,043 | 6/1992 | Hunt et al. | 379/88 |
| 5,274,695 | 12/1993 | Green | 379/88 |

OTHER PUBLICATIONS

Ann E. Conrad, "Giving Phone Systems a Voice", Telecommunications, Apr. 1984, pp. 122–126.

Fumitada Itakura, et al., "Distance Measure for Speech Recognition Based on the Smoothed Group Delay Spectrum", IEEE Conference on Acoustics Speech and Signal Processing (ICASSP), IEEE, 1987, pp. 1257–1260.

Jayant Naik, et al., "Evaluation of a High Performance Speaker Verification System for Access Control", IEEE, 1987, pp. 2392–2395.

George Velius, "Variants of Cepstrum Based Speaker Identify Verification", Conference on Acoustics Speech and Signal Processing (ICASSP), IEEE, 1988, pp. 583–586.

Alan B. Poritz, "Hidden Markov Models: A Guided Tour", IEEE Conference on Acoustics Speech and Signal Processing (ICASSP), IEEE, 1988, pp. 7–13.

Yuan–Cheng Zheng, et al., "Text–Dependent Speaker Identification Using Circular Hidden Markov Models", IEEE Conference on Acoustics Speech and Signal Processing (ICASSP), IEEE, 1988 pp. 580–582.

JoEllen Wilbur, et al., "Consistent Speaker Identification via Wigner Smoothing Techniques", IEEE Conference on Acoustics Speech and Signal Processing (ICASSP), IEEE, 1988 pp. 591–594.

Joseph B. Attili, et al., "A TMS32020–Based Real time, Text–Independent, Automatic Speaker Verification System", IEEE, 1988 pp. 599–602.

Lawrence R. Rabiner, "A Tutorial on Hidden Markov Models and Selected Applications in Speech Recognition", IEEE Proceedings, vol. 77, No. 2, Feb. 1989, pp. 257–286.

H. A. Murthy, et al., "Formation Extraction From Phase Using Weighted Group Delay Function", Electronics Letters, vol. 25, No. 23, Nov. 9, 1989, pp. 1609–1611.

Richard Schwartz, et al., "Robust Smoothing Methods for Discrete Hidden Markov Models", IEEE Conference on Acoustics Speech and Signal Processing (ICASSP), IEEE, 1989, pp. 548–551.

Jayant M. Naik, et al., "Speaker Verification Over Long Distance Telephone Lines", IEEE Conference on Acoustics Speech and Signal Processing (ICASSP), IEEE, 1989, pp. 524–527.

Jay G. Wilpon, et al., "Automatic Recognition of Keywords in Unconstrained Speech Using Hidden Markov Models", IEEE Transactions on Acoustics Speech and Signal Processing (ASSP), IEEE, vol. 38, No. 11, Nov. 1990, pp. 1870–1878.

Jerome R. Bellegarda, et al., "Tied Mixture Continuous Parameter Modeling for Speech Recognition", IEEE Transactions on Acoustics Speech and Signal Processing (ASSP), IEEE, vol. 38, No. 12, Dec. 1990, pp. 2033–2045.

Michael Savic, et al., "Variable Parameter Speaker Verification System Based on Hidden Markov Modeling", IEEE Conference on Acoustics Speech and Signal Processing (ICASSP), IEEE, 1990 pp. 281–284.

Jayant M. Naik, "Speaker Verification: A Tutorial", IEEE Communications Magazine, 1990, pp. 42–48.

Wang Ren–hua, et al., "A Weighted Distance Measure Based on the Fine Structure of Feature Space: Application to Speaker Recognition", IEEE Conference on Acoustics Speech and Signal Processing (ICASSP), IEEE, 1990, pp. 273–276.

Hema A. Murthy, et al., "Speech processing using group delay functions", Signal Processing, Mar. 1, 1991, pp. 259–267.

Peter Meyer, et al., "Design and Evaluation of Optimal Cepstral Lifters for Accessing Articulatory Codebooks", IEEE Transactions on Signal Processing, vol. 39., No. 7, Jul. 1991, pp. 1493–1502.

Voice Processing Corporation Press Release entitled "Voice Processing Corporation and Reetra Systems Announce New OS/2 Interface", Nov. 1, 1991.

Japanese patent abstract, Publication No. JPA60 235566, Publication Date 1985, vol. 10 No. 91.

AT&T Technical Journal, Sep. 1986, vol. 65, No. 5, pp. 68–74, "A Voice Password System for Access Security", M. Birnbaum et al.

"Conversant 1 Voice System: Architecture and Applications", R.J. Perdue et al., *AT&T Tech. Jour.*, vol. 65, No. 5, Sep./Oct. 1986, pp. 34–47.

"Recent Achievements in Speech Processing Technologies and Their Applications", M. Immendoerfer et al., *Electrical Communications*, vol. 62, No. 3/4 1988, pp. 288–293.

"A Perspective on Speech Processing", S.E. Levinson et al., *IEEE Communications Magazine*, Jan. 1990, pp. 28–34.

"Automation of Alternate Billed Calls Using Speech Recognition", M. Murphy et al. *IEEE Communications Magazine*, Jan. 1991, pp. 25–29.

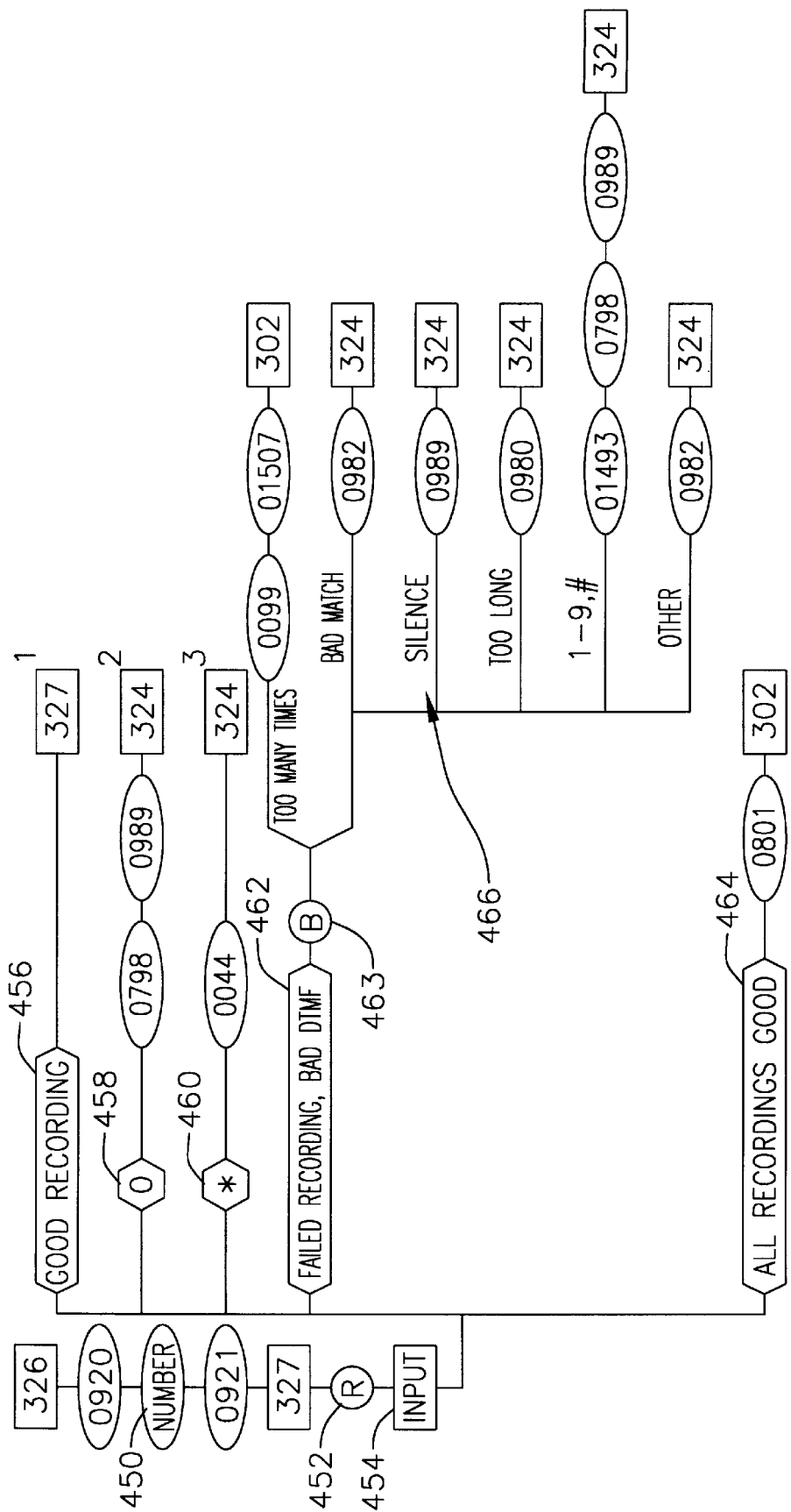

VOICE CONTROLLED MESSAGING SYSTEM AND PROCESSING METHOD

CROSS-REFERENCE TO RELATED APPLICATIONS

This is a continuation of application Ser. No. 08/358,971, filed Oct. 19, 1994, now abandoned, which is a continuation of application Ser. No. 07/815,411, filed Dec. 31, 1991, now abandoned.

FIELD OF INVENTION

This invention generally relates to digital voice processing methods for control of voice messaging systems. The invention specifically relates to hands-free or total voice control of voice processing systems connected to the telephone network.

PROPRIETARY RIGHTS NOTICE

A portion of the disclosure of this patent document contains material which is subject to copyright protection. The copyright owner has no objection to the facsimile reproduction by anyone of the patent document as it appears in the Patent & Trademark Office file or records, but otherwise reserves all other rights.

BACKGROUND OF THE INVENTION

A. Voice Controlled Messaging Systems

In voice messaging systems (VMS) coupled to the public switched telephone network, a user (or "subscriber") usually controls the VMS by pressing push buttons by hand on a dual tone multi-frequency (DTMF) keypad of a telephone set. This method of data input is inconvenient, and even dangerous, when the user's hands, eyes, or both, are busy.

For example, when a user is operating a car phone or cordless telephone the user may be occupied by other tasks (such as driving a car) which make manual data input difficult or dangerous. Other circumstances include use of the telephone while typing, using a computer terminal, or working at a workbench. Owners of rotary dial telephones cannot generate DTMF signals needed by most VMSs. Moreover, persons having impaired sight and persons who lack hands or have other physical handicaps may find using telephone sets difficult or impossible. In all these cases, voice commands are the only convenient means of interacting with and controlling a VMS.

General functions of VMSs are well known, as shown in U.S. Pat. Nos. 4,352,807 and 4,371,752 (Matthews et al.) which disclose voice-store-and-forward systems. In most prior art systems, the user controls all or most of the functions of a VMS by manual input of DTMF digits. For example, in the Matthews et al. '807 patent, DTMF keypresses are required for some system functions such as enrollment of message recipients. In both the '807 and '752 patents, the VMS requires DTMF input and responds with "beep" sounds rather than digitized voice prompts. FIG. 16 of the '752 patent indicates that the '752 system requires DTMF digits for user identification.

Prior attempts to automate VMSs have focused on elements of a system but fail to automate the entire system. For example, U.S. Pat. No. 5,048,074 (Dugdale) simply replaces DTMF pushbuttons with foot switches.

Text to speech (TTS) conversion is a known means for supplying a text or e-mail message to a caller, as exemplified by U.S. Pat. Nos. 4,716,583 and 4,659,877. However, prior TTS systems have required use of DTMF digits to configure and operate the system, as shown in FIGS. 3a and 3b of the '583 patent. Similar systems, exemplified by U.S. Pat. No. 4,996,707, enable conversion of a facsimile (fax) document into ASCII text for routing to a TTS system. This enables audible playback of a fax. However, the '707 and similar systems have all required entry of DTMF digits for control.

Voice command systems with limited capabilities are also known, as exemplified by U.S. Pat. No. 5,051,924. This system and others requires DTMF dial-up of a VMS rather than voice command access to messages in the VMS.

Prior voice messaging systems also tend to require excessive computation resources, since in typical systems, a single digital signal processor (DSP) IC, the DSP must perform many voice processing functions besides hands free control. U.S. Pat. No. 4,974,191 is typical of computation-intensive voice response systems. In a typical VMS, very few DSP machine cycles are available just for voice control. Thus, those of skill in the art would appreciate an efficient implementation to allow other voice-band activity of significant computational cost to run concurrently.

Another desirable feature is to have hands free processing available on all voice ports of a VMS so that any user can use hands free processing. Yet another desired feature is real time response to voice commands. The prior art fails to provide these features. For example, typical performance of the AT&T VMS, which is well known in the art, is 8.8 seconds to verify a spoken password. In contrast, one embodiment of the present invention has operated with response times of less than one-half second. Yes/no recognition has been measured at under 700 ms.

Another disadvantage of the prior art is that performance parameters are not completely configurable, i.e., the parameters cannot be changed to other values while the messaging system is operational. This is a disadvantage since configurability can be used to optimize the parameters to the desired level of performance for the available processing power and to match characteristics of the location or site of the system.

Those skilled in the art would also appreciate a totally voice controlled messaging system implemented on a general-purpose digital signal processor (DSP) which serves multiple channels of voice-band activity while using a maximum number of processor cycles for voice control processing.

B. Speaker Verification

Speaker verification methods are also known in the art, as exemplified by U.S. Pat. No. 5,056,150. The general object of speaker verification is to establish a digitally stored template for a particular speaker uttering a selected, uninterrupted word ("feature extraction"), and then upon subsequent trials to estimate the confidence level associated with the same speaker uttering the same word ("pattern matching"). Feature extraction performs transformations on the speech signal to yield a template that represents the signals being compared. Pattern matching makes a comparison between a stored template and a template generated for an input signal, and yields numeric results about the proximity of the two templates. In both processes a primary goal is eliminating undue statistical variation among separate trials. Speech recognition also involves other discrimination tasks, but the present invention relates most directly to the closeness of match between the template and the new utterance.

The prior art of speaker verification generally treats feature extraction and pattern matching separately. In general, prior art methods do not relate to a combination of feature extraction and pattern matching, which combination is disclosed in the present invention. Moreover, in the present invention feature extraction is accomplished using smoothed group delay function (SGDS) and pattern matching for speaker variation using the hidden Markov model (HMM), a combination not known in the art.

The central function of feature extraction is to transform a brief time frame of the speech signal into a feature vector. A straightforward method is to measure the average energy of the signal over a given time frame. The same process is repeated for all the time frames of interest (such as the time needed to utter a phrase). A two-dimensional pattern is produced, which may be compared to a similarly-generated one. This time-energy method can discriminate between short and long phrases, or between speech and non-speech, but cannot recognize words or identify speakers.

A better method of feature extraction is to separate the signal into frequency components ("spectral analysis"). This can be done with bandpass analog filters, or in a digital signal processor by the Fourier transform. Instead of a single value for each time slice as in time-energy analysis, spectral analysis yields either a set of amplitude envelopes for each frequency analyzed. The resulting template is like a topographic map, in which the goal is to match the location and height of peaks.

Spectral analysis can discriminate words of a language, but is poor for discriminating between speakers. Further, it is strongly affected by passing the signal through a channel that does not have a "flat" frequency response, and is affected by noise, both of which are problems in telephony.

"Cepstrum" analysis has been applied to signals containing echoes. Like Fourier analysis, it yields a spectral representation, but the independent variable is time difference (lag) instead of frequency. Its computation is approximately the same as two Fourier transforms and a nonlinear expansion. Its benefit is that the resulting lag spectrum, or cepstrum, may separate the effects of three or more sources of a difference in speech timbre, thereby enhancing discrimination among speakers.

The group delay spectrum is a differently weighted but similarly derived form of spectral analysis, and is described in Itakura & Umezaki, "Distance measure for speech recognition based on the smoothed group delay spectrum", IEEE Conf. on Acoustics, Speech and Signal Processing (ICASSP), IEEE, 1987, pp. 1257–1260. It can yield a more prominent set of features for matching.

Performance of cepstrum and group delay can be varied by changing parameters. Manipulation of two scalar values "s" and "tau" of Equation (7) of Itakura et al. can reconfigure one into the other, or either into another spectrum. The effect is like tuning a piano. In the prior art conventional windowing techniques are known to reduce effects of sampling or finite interval selection. The terms "windowing" and "smoothing" are often used interchangeably.

In the prior art hidden Markov modeling (HMM) is used to establish an assumption about the underlying behavior of a physical process. In HMM's the Baum-Welch, or "forward-backward" method is the central part of a solution to the model, but to be complete, the remainder of a solution must be specified. Poritz, "Hidden Markov models: a guided tour" ICASSP, IEEE, 1988, pp. 7–13, Section 7 describes use of the hidden Markov model (HMM) and the Baum-Welch method in general speech processing. As noted in Poritz FIG. 6 and its accompanying text, use of the method must be preceded by selecting (either randomly or deterministically) initial seed values for the auxiliary function "Q", then application of Baum-Welch, then assessment of whether a critical point has satisfactorily been reached, then reiteration as needed.

As is known in the art, hidden Markov models can be characterized by order and number of states. Usually an increased order coupled with an increased number of states increases the computational burden more than the product of the two. Those of skill in the art would find useful a processing system which provides a lesser processing load when the order and number of states are both increased.

Prior speaker verification methods have been used with a single-microphone, e.g., for entry to a secure room. Those of skill in the art would appreciate a speaker verification method optimized for use with the telephone network and which can cope with variation in performance of telephone lines and microphones.

SUMMARY OF INVENTION

Accordingly, this invention provides means and methods for total voice control (hands free control) of voice-messaging and voice-response systems, through means for manipulation of voice messages over the telephone without the need for keypressed commands. Manipulation includes playback of messages, deletion of messages, saving messages, and sending a new message to a recipient from a user-defined list. Access to the messaging system is by spoken password. Voice input also allows the following functions: enrollment of a spoken password; granting or refusing user access to the system based on verification of the user speaking a password; recognition of spoken utterances of "yes" and "no" in response to prompts by the VMS; recognition of "stop" to interrupt and stop a voice message during playback; enrollment of a spoken personal directory of names of potential message recipients; and recognition of names in the spoken personal directory.

In the preferred embodiment, a user accesses the system by dialing its telephone number; thereafter, interaction of the user and the system is entirely controlled by voice, leaving the user's hands and eyes free for other tasks. The preferred embodiment uses four main speech technologies: speaker verification, speaker-independent recognition (SIR) of "yes/no", speaker-independent recognition of "stop" during message playback, and speaker-dependent recognition (SDR) of a limited vocabulary of short phrases such as a list of message recipients' names. The invention achieves real-time response for all four technologies, is highly resistant to noise, is adept at rejection of invalid speech by impostors, and has robust error handling.

The present invention provides improved methods for automatically verifying the identity of a speaker seeking access to voicemail transactions by comparing a digitized, spoken phrase to a stored representation of that phrase by the same speaker. The methods applied comprise a calibration mode, an enrollment mode and a verification mode. The physical means for carrying out the method are one or more programmable processors, such as a digital signal processor hosted by a general-purpose computer, the latter controlling voicemail functions after verification has been established. According to the invention, smoothed group delay spectrum (SGDS) is used for establishment of a distance metric to compare an input utterance with a stored template. The template comprises a statistically distributed standard of utterances. In the invention methods based on the hidden Markov model (HMM) are used for summation of a scalar likelihood value which may be windowed to discern whether the speaker is valid or an impostor. The invention increases the dimension of the feature vector, and increases the order of the HMM transition matrix, both beyond the order ordinarily required to recognize or reconstruct speech for increasing the method's ability to discriminate among speakers. The invention also improves processing rates of noise calibration and comparison, and provides enhanced spectral discrimination between the useful components of speech and unvoiced consonants or non-speech.

In one preferred embodiment, the voice messaging system includes telephone line interface modules which couple telephones to at least one voice port. The modules provide digitized voice data to a digital signal processor (DSP). The DSP processes digital voice data and changes characteristics of digitized voice signals under control of a program stored in a program store coupled to the DSP. All program parameters are configurable, enabling site-specific performance optimization.

The invention can be further understood with reference to the attached drawings:

BRIEF DESCRIPTION OF DRAWINGS

FIG. 1, comprising

FIG. 1A is a system level block diagram of the voice messaging system;

FIG. 1B is a block diagram of a line interface controller in the system of FIG. 1A;

FIG. 1C is a block diagram of a preferred data format used by the system of FIG. 1;

FIGS. 4a to 4e and FIGS. 5a to 5c are state diagrams of logical flow in the embodiment of FIG. 3;

FIG. 6a to 9b are block flow diagrams of logical flow of a control program representing one preferred embodiment of the invention, and in particular, FIGS. 6a to 6b are flow diagrams of an enroll password mode and an enroll recipient's name and word STOP mode of the preferred embodiment of the invention;

FIGS. 8c, 8d, 9a, and 9b are flow diagrams of a send message mode including a recognize recipient name subroutine of the preferred embodiment of the invention.

DETAILED DESCRIPTION OF PREFERRED EMBODIMENTS

In the following detailed description of the preferred embodiments, specific terminology is used for the sake of clarity. However, the invention is not limited to the specific terms used, but includes all technical equivalents functioning in a substantially similar manner to accomplish a substantially similar result. One of skill in the art to whom this disclosure is directed is assumed to be proficient in programming in the C language and the UNIX operating system, and to be familiar with B. W. Kernighan et al., "The C Programming Language," ISBN 0-13-110163-3, and "UNIX Programming." Familiarity with "UNIVOX VDS General Description" and "UNIVOX Maintenance and Administration Manual", commercially available from Digital Sound Corporation, is also assumed. One of skill in the art should also be familiar with AT&T System V/386 User's Reference Manual, System Administrator Reference Manual and Programmer's Reference Manual, all commercially available from AT&T.

A. System Overview

Figure 1A:
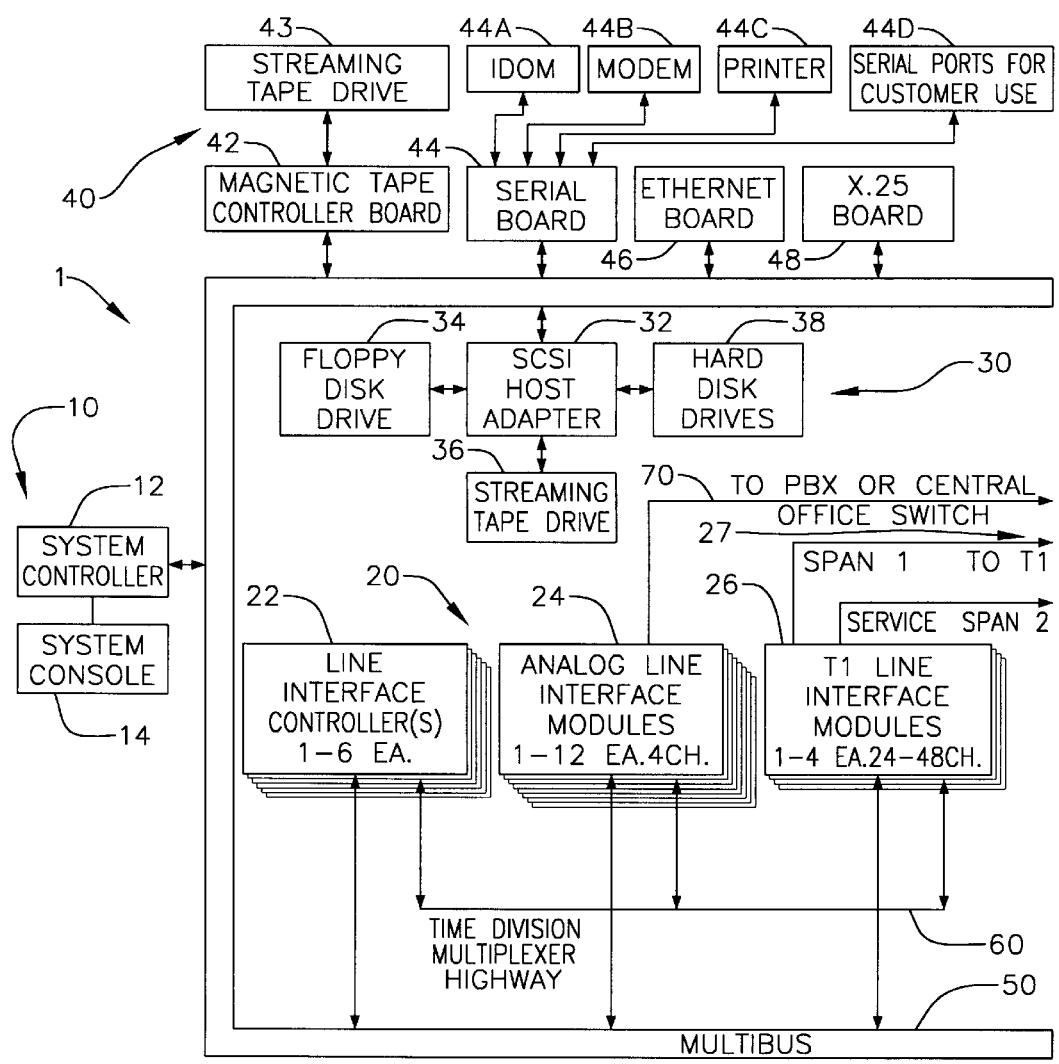
FIGS. 1A to 1C, is a block diagram of a voice messaging system on which the present invention can be implemented.

FIG. 1A shows a prior art voice messaging system 1 in which the present invention is preferably implemented. The system comprises control elements 10, telephone line interface elements 20, and peripheral interface elements 30, 40. These elements exchange data and control signals on a Multibus 50 which can follow the Multibus protocol developed by Intel Corporation. Multibus is a registered trademark of Intel. An independent bus 60, called a time division multiplexed (TDM) highway, enables fast transfer of digitized voice band data. The system 1 preferably is the VoiceServer 2110 commercially available from Digital Sound Corp., Carpinteria, Calif. This system is described in VoiceServer System Reference Manual, available from Digital Sound Corp.

The control elements 10 include a system controller 12, which preferably is an Intel 386-class CPU with conventional support electronics, coupled to the Multibus and to a system console 14, containing a cathode ray tube (CRT) display and keyboard entry system of conventional type.

The telephone interface elements 20 include one or more analog line interface modules 24, which receive incoming calls on a public switched telephone line 70. As is known in the art, the analog interface modules digitize incoming call signals and assign the call to a channel in the system. If incoming digital telephone lines are available, such as lines following the T1 standard protocol, then one or more T1 line interface modules 26 of conventional design are provided to couple T1 lines to the digital elements of the system. As is known in the art, T1 interfaces provide digital voice communication at 1.544 megabits/second as defined in CCITT recommendations G.703 and G.704.

Figure 1B:
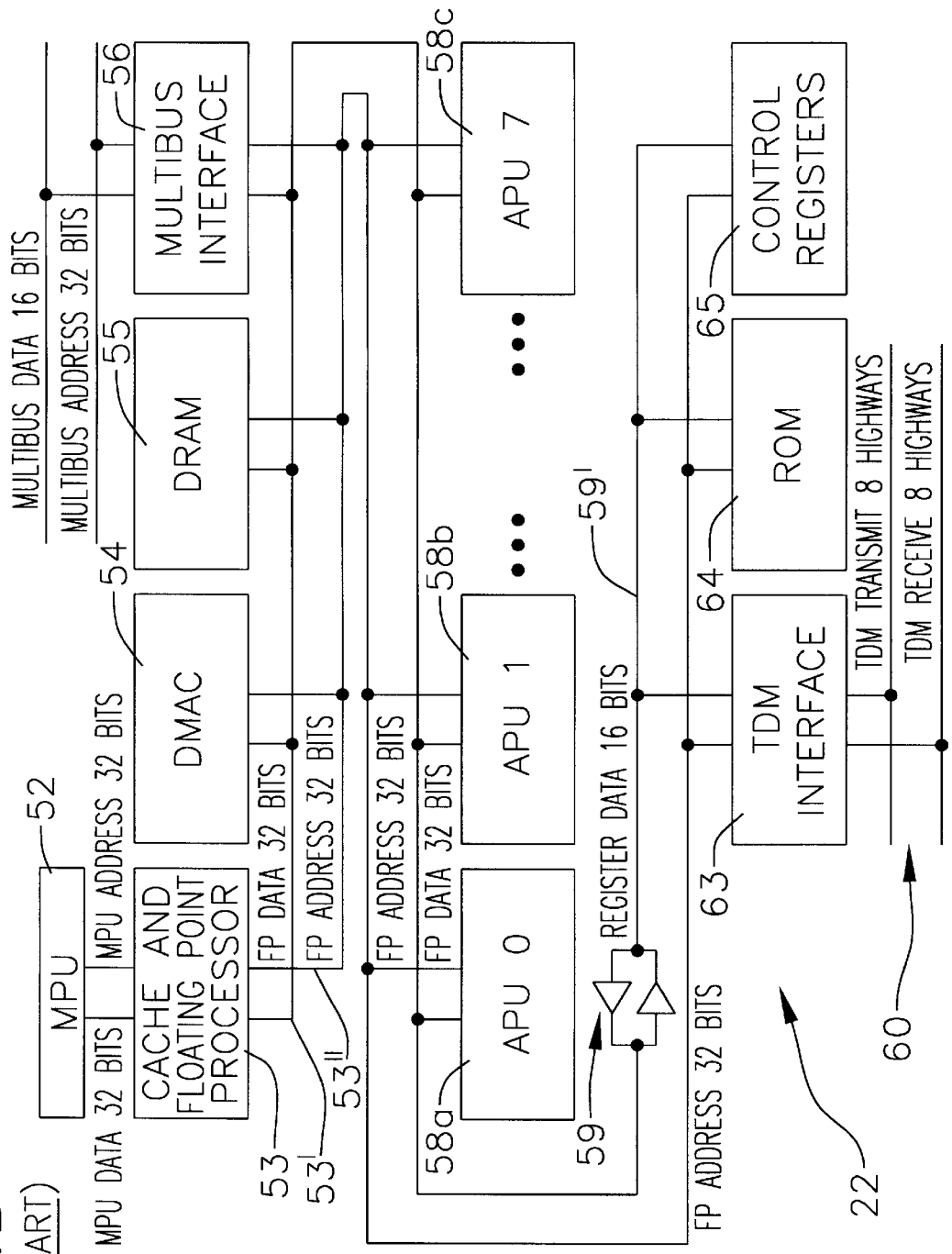
Figure 1C:
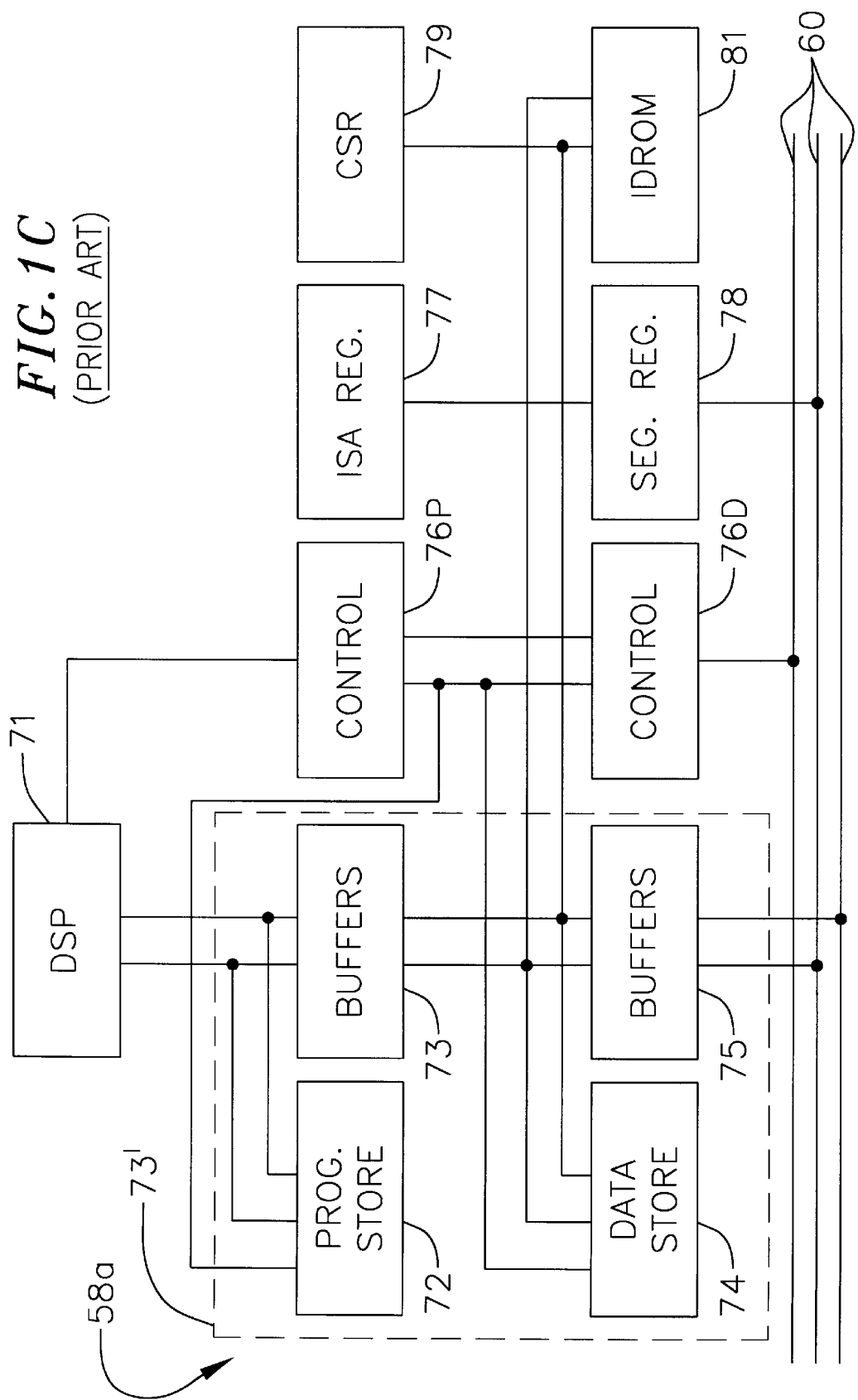

Digital signal processing of voice messages and control signals is done by one or more line interface controllers (LICs) 22 which are shown in detail in FIGS. 1B and 1C. Referring to FIG. 1B, each LIC 22 preferably includes a complete conventional microcomputer 52 coupled to a plurality of arithmetic processing units (APUs) 58a–58c each containing at least one digital signal processor (DSP). The microcomputer preferably is type 80386 commercially available from Intel. The DSP preferably is the TMS320C25 available from Texas Instruments Inc. In one preferred embodiment the microcomputer 52 is coupled to cache memory processor and a floating point processor 53 over 32-bit data and address buses. Output from the cache and floating point processors 53 are placed on 32-bit floating point (FP) data and address buses 53' and 53" which are coupled to a direct memory access controller (DMAC) 54. Also coupled to the FP buses are up to 8 mbytes of dynamic random access memory (DRAM) 55, and preferably eight of the APUs. The DMAC preferably is a type 82350 integrated circuit commercially available from Intel. A bidirectional Multibus interface 56 couples the LIC FP buses to the Multibus, by multiplexing and connecting signals from the buses to each other. A data bus two-way transceiver 59, reduces the 32-bit FP data bus to a 16-bit bus 59' which is coupled to a read-only-memory (ROM) 64 and control registers 65. The transceiver is conventional and enables two-way communication of a 16-bit signal on either a 16-bit or a 32-bit data bus. Common control circuits for bus arbitration, address decoding, TDM highway watchdog timing, and decoding requests for access to on-board registers which are known in the art are employed in the LIC. A TDM interface 63 couples the FP address bus and the 16-bit data bus to TDM highway 60. The TDM interface decodes a serial data stream on the TDM highway and assigns serial bit blocks in the stream to one of the APUs on the FP bus. Two buses, in the form of TDM highway 60 and the FP buses, enable separation of voice data from control functions by providing a separate bus, the TDM highway, dedicated to digitized voice data. These components and their interaction are well known.

An exemplary APU is shown in block form in FIG. 1C. Each APU contains a DSP 71, preferably the TMS320C25 of Texas Instruments Inc., coupled to a conventional memory having at least several kilobytes of storage in the form of a conventional electronic random access memory (RAM) 73. The RAM 73 preferably is divided into a program store 72 of preferably 32k words and associated program buffers 73, and a data store 74 (64k words) and data buffers 75. Control circuits 76P, 76D handle data interchange between the DSP and the memory. FP bus access is handled using registers 77, 78 and IDROM 81. A segment register (SEG REG) 78 extends 16-bit addresses from the DSP to 32-bit addresses used on the rest of the board. A command status register (CSR) 79 couples i/o interrupts to and from the DSP, and also provides reset and hold bits for the DSP. A time slot assignment (TSA) register controls orientation of TDM highway serial data. The IDROM contains character data to identify the APU board so that the system controller can determine the system configuration by reading the IDROM. The DSP preferably serves multiple channels of voice-band activity. The invention is preferably implemented in assembly code software on the DSP, as discussed in detail below.

Depending on the needs of the system user, a plurality of peripheral devices are interfaced to the system. For example, a Small Computer System Interface (SCSI) host adapter 32 are coupled to the Multibus and a streaming tape drive 36, a floppy disk drive 34, and one or more mass storage devices such as hard disk drives 38 can also be connected in known manner. The hard disk drives provide primary storage for voice data and can also provide storage for system software; via the Multibus, the disk drives are indirectly coupled to the DSPs on the LICs. Further, a magnetic tape controller board 42 is provided to interface the Multibus to a streaming tape drive 43. A serial communication interface board 44 can connect to a plurality of serial devices such as IODM 44A, modem 44B, printer 44C, and user ports 44D. Additional communications is provided using Ethernet board 46 and an X.25 board 48. Electronic and interface details of the elements designated 30 to 48 are conventional and well known.

B. DSP Operation

Each DSP in an APU on a LIC communicates with voice signals in a plurality of channels of data on the TDM highway. For each channel, at intervals equal to a predetermined sampling period (typically 8 KHz), the DSP receives a voice data sample value (receive data), and transmits a sample value (transmit data). Data reception and transmission occurs on the TDM highway.

Voice data samples are obtained by the analog interface modules 24 which receive analog voice audio from a telephone line on trunk 70. The audio is fed to an analog-to-digital converter on the LIM 24 which samples the analog data at 8 Khz, the standard voice-band sampling frequency used in the telephone network. The samples are in linear 12-bit form, thus having a value represented by an integer ranging from −2048 to +2047. The sampled data is fed in a stream from the LIM to the TDM highway.

By communicating through an APU on a LIC, the DSP receives and accumulates, over a fixed time period, a fixed number of receive digital data points to form a receive "frame" stored in a discrete area in the data store. Outgoing transmit data points are likewise accumulated to form a transmit frame in the data store. This period is called the frame duration and preferably comprises 180 sample points representing 22.5 ms of voice data sampled from an audio signal.

Over a frame duration, the DSP processes the signals represented by the received frames and transmit frames, for each channel of activity, as directed by DSP software in the program store. The DSP can perform several different types of processing including speech encoding and decoding, companding, tone detection and generation, speech recognition, text-to-speech conversion, etc. All require DSP processing or computation. Thus, the frame duration determines the maximum total number of computations possible per frame of transmit and receive data.

The invention is preferably implemented on the system of FIG. 1A using a computer program for the DSP written in the C source language. Preferably the C code is tested, debugged, and then hand-assembled into DSP assembler code, which is linked by the TMS302C2x DSP Assembler program commercially available from Texas Instruments. The assembled object code is stored on the hard disk drives 38 and loaded into DSP memory when the system is powered-up. Ordinarily the system remains on continuously so the software is always available in memory. Publications disclosing such DSP programming include "Second-Generation TMS320 User's Guide," No. 1604907-9702 (June 1989) and "TMS320C1x/TMS320C2x Assembly Language Tools User's Guide," No. 1604908-9706, commercially available from Technical Publications Manager, Texas Instruments Inc., P.O. Box 1443, MS 640, Houston, Tex. 77001, the contents of which are hereby incorporated by reference.

C. Total Voice Controlled Messaging System—General Features

The present invention provides a plurality of processing methods which are preferably combined to form a total voice controlled VMS. In a preferred embodiment, the invention preferably comprises a plurality of stored programs written in the C source language and stored in the disk drive 38. The programs can be combined into a single application program or can serve as stand-alone functions for selective integration into an application program. For example, the programs can be integrated into the InfoMail application program commercially available from Digital Sound Corp. (address above). InfoMail is described in the InfoMail User Interface Reference Guide, Digital Sound part no. 5950-0863. One preferred embodiment of the present invention is the C language program "handfreeB.c". Further information about the speaker verification feature of the invention is given in "VoiceServer System VDS Speaker Verification Application Guide," Digital Sound Corp. part no. 5950-1203. Speech recognition processing is described in "VoiceServer System Speech Recognition Programming Reference," Digital Sound Corp. part no. 5950-1449.

Figure 2:
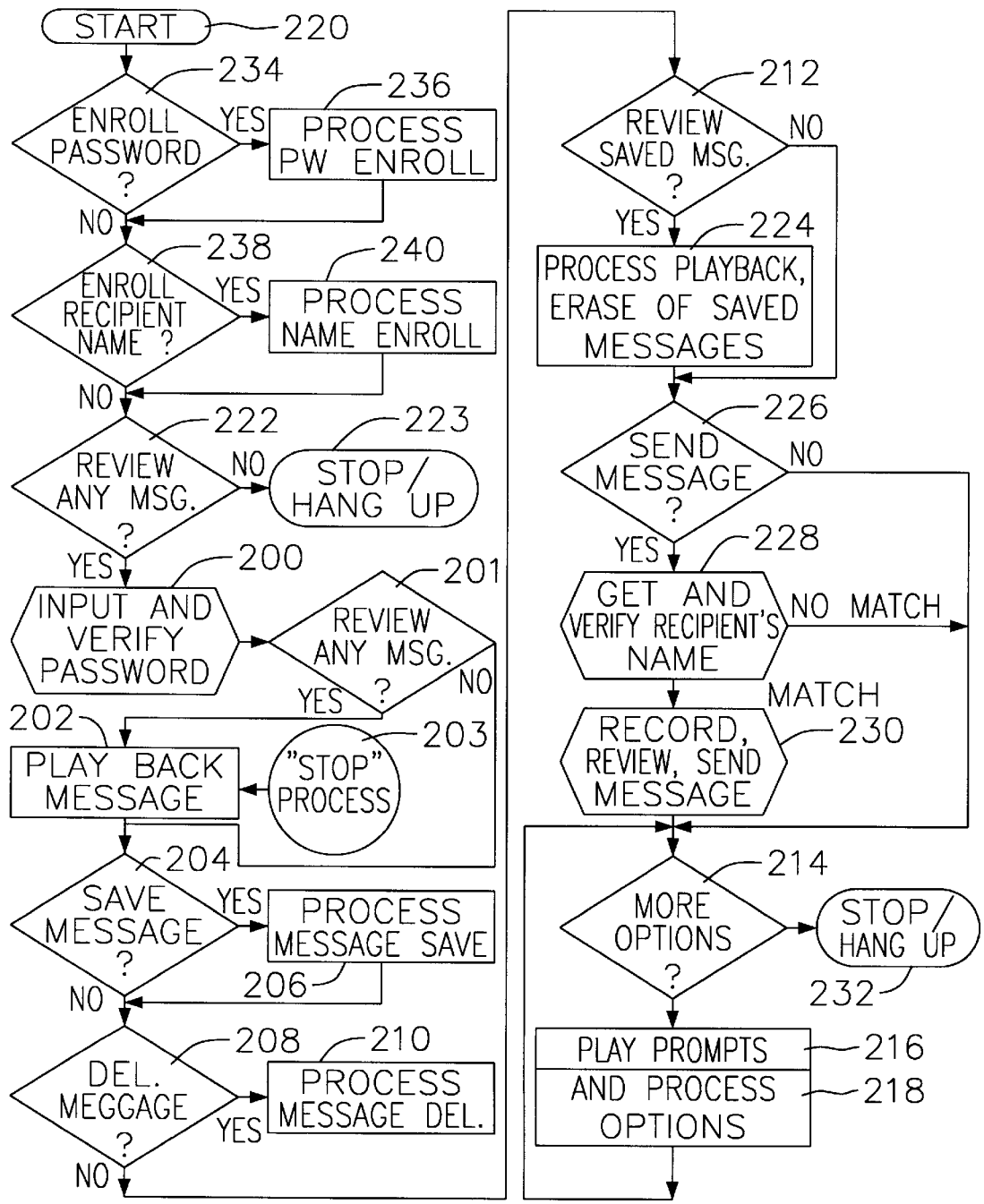
FIG. 2 is a high-level flow diagram of principal features of a preferred embodiment of the invention.

FIG. 2 shows the general logical flow of principal features in the method of the invention. Implementation of each feature is discussed in detail below. In general, the invention provides means for conducting an interactive dialogue with a user ("subscriber") of a voice messaging system. Initiation of the dialogue (not shown) begins at block 220 when a user calls a voice messaging system ("VMS") using the public switched telephone network. For example, a user of a VoiceServer 2110 can call a telephone number designated as the "mailbox" of the subscriber. The VMS responds by playing back a prerecorded greeting.

In one embodiment, enrollment functions are provided off-line or in a separate mode, as shown by blocks 234 to 240. In step 234, a subscriber is prompted whether to enroll a new password. Blocks 234 and 238 expect a YES or NO response from the subscriber. If affirmative then in block 236 the VMS permits enrollment (encoded recording) of a new password. In blocks 238 and 240 enrollment of a message recipient's name is handled. These features are described in detail below.

Next in block 222 the VMS plays a prerecorded prompt message (termed a "prompt"), which asks the subscriber whether any messages should be reviewed, as shown in block 222. If not, then the VMS ends the session by branching to another DSP program or disconnecting the subscriber, as shown by block 223. If so, then the VMS plays a prompt which asks the user to speak his password into the telephone. This prompt message, and others used by the VMS, preferably are each digitally separate digitized voice data files. One preferred set of voice prompt files appears in Table 1, showing the file name and the content of the voice prompt. These prompts are used in the present embodiment of the invention, as described below. As shown in block 200 of FIG. 2, the VMS then waits while the user speaks and verifies that the password is correct.

Speaker verification is a technology which allows a VMS to verify a speaker's identity, thus rejecting imposters. In a VMS, speaker verification can be used to establish a "spoken password". To gain entry to a voice mailbox, a user speaks a voice password. If the spoken password matches a prerecorded password enrollment template, the subscriber's identity is verified. Otherwise, the password is rejected and entry is denied.

Speaker verification is preferably implemented using a template matching method. A digitized speech signal is converted into a plurality of cepstral coefficients which are numbers uniquely identifying the speech signal. Hidden Markov models (HMMs) are used to represent speech and serve as a template. During enrollment an HMM is created. During verification the enrolled HMM is compared to an HMM created from an input utterance.

If the password is not verified, the prompt is repeated and the user can try again. After two failed attempts, the VMS ends the dialogue and disconnects the phone connection.

Otherwise, in step 201 the VMS prompts the subscriber whether new messages should be played back. The VMS waits for a YES or NO response from the subscriber. If YES is received, the VMS next begins to play back all new messages of the subscriber, as shown in step 202. Playback can be prefaced with a prerecorded message such as "you have three new messages." The messages are played back serially from the mass storage system. During playback, the subscriber can say "stop" into the telephone, as shown in block 203. In response, the VMS will stop playback.

Ordinarily the messages are digitized voice messages stored on the mass storage system. However, the present invention also provides the capability of playing back electronic mail ("e-mail") messages which are stored as text rather than digitized speech. E-mail messages are typically stored in a disk file in ASCII or EBCDIC character text. When an e-mail message is in the subscriber's queue, then the VMS plays a prompt asking whether the message should be delivered verbally. If so, then the message is retrieved and routed to a text-to-speech converter which synthesizes audible speech corresponding to the text of the e-mail message. If not, then the VMS plays a prompt asking whether the message should be delivered to a facsimile ("fax") machine. If so, then a separate dialogue, explained below, is initiated to elicit information about where to send a fax. The e-mail message is then retrieved and converted to fax format prior to sending.

After playback is complete, the VMS plays a prompt asking whether the subscriber wishes to save any of the messages just played, as shown in step 204. If so, message saving is processed in step 206.

Thereafter the VMS plays a prompt asking whether the subscriber wishes to delete any of the messages, as shown in step 208. If so, message deletion is processed in step 210. The VMS next plays a prompt asking whether the subscriber wishes to retrieve and replay any of the saved messages, as shown in step 212. If so, the message is retrieved and replayed as shown in step 224. Step 224 can also include substeps allowing a subscriber to erase any of the saved messages.

During each of steps 204, 208, and 212, the VMS uses speaker-independent recognition to process and interpret the subscriber's reply to the VMS prompt. In alternative embodiments speaker-dependent recognition or other speech recognition technologies can be used.

Steps 226 to 230 provide a send message feature. As shown in step 226, the VMS plays a prompt asking whether the subscriber wishes to send a message to another subscriber. If so, then in step 228 the VMS prompts the sending subscriber to speak the receiving subscriber's name. The VMS records the spoken name and compares it to a table of enrolled recipient names stored in the data store or on the mass storage device. If a match is made then in step 230 the VMS prompts the sending subscriber to speak a message which is recorded and then sent to the receiving subscriber's mailbox. Step 230 preferably includes substeps enabling the sending subscriber to replay, review, and erase the recorded message before sending it.

The send message feature also preferably includes sending a message to a list of recipients in a table stored in the VMS. Alternatively, the VMS can use SDR to recognize the name of the message recipient and retrieve a mailbox address corresponding to the recipient from memory in the VMS. In such a case, the VMS preferably carries out a name confirmation step, by playing back synthesized speech of the name using name to speech (NTS) methods. The subscriber then confirms that the named recipient is correct with a "yes"/"no" response. Preferably the VMS also includes an "urgent" marking feature whereby messages sent to recipients can be marked as "urgent," placing the marked message at the beginning of the playback queue.

Next the VMS plays a prompt asking whether the subscriber wishes to hear more message processing options as shown in step 214. In step 214, 204, and 208, the VMS expects a "yes" or "no" answer which is interpreted, as explained below, using speech recognition of an affirmative or negative response. In the preferred embodiment the words YES and NO are sensed, but affirmative and negative responses in other languages can be sensed. If the response is yes, prompts are played back as shown in step 216. After the user selects an option it is processed in step 218. Thereafter the messaging session terminates.

Another option preferably processed in step 218 is administrative functions such as changing a mailbox configuration, user name, telephone or fax numbers, etc.

When a message is routed to a fax machine then a separate dialogue is initiated to retrieve information about the destination of the message. The dialogue is preferably structured as a series of prompts which require yes/no answers. The dialogue first asks whether the fax should be routed to the subscriber's voice line, i.e., the line on which the dialogue is being carried out. If so, then the subscriber is told to hang up after which the VMS calls the subscriber's line and delivers the message by fax. If not, and if the subscriber has a separate fax line, then the subscriber is asked whether the message should be delivered to the subscriber's default fax line. If so, then the subscriber is told to hang up after which the VMS calls the subscriber's line and delivers the message by fax. If not, then the subscriber is prompted to enter a fax line number either using DTMF digits or by spoken digits. In the latter case, the VMS uses continuous SIR of the spoken digits to interpret the phone number to which the fax should be sent.

D. Detailed Description of Preferred Embodiment

Figure 6A:
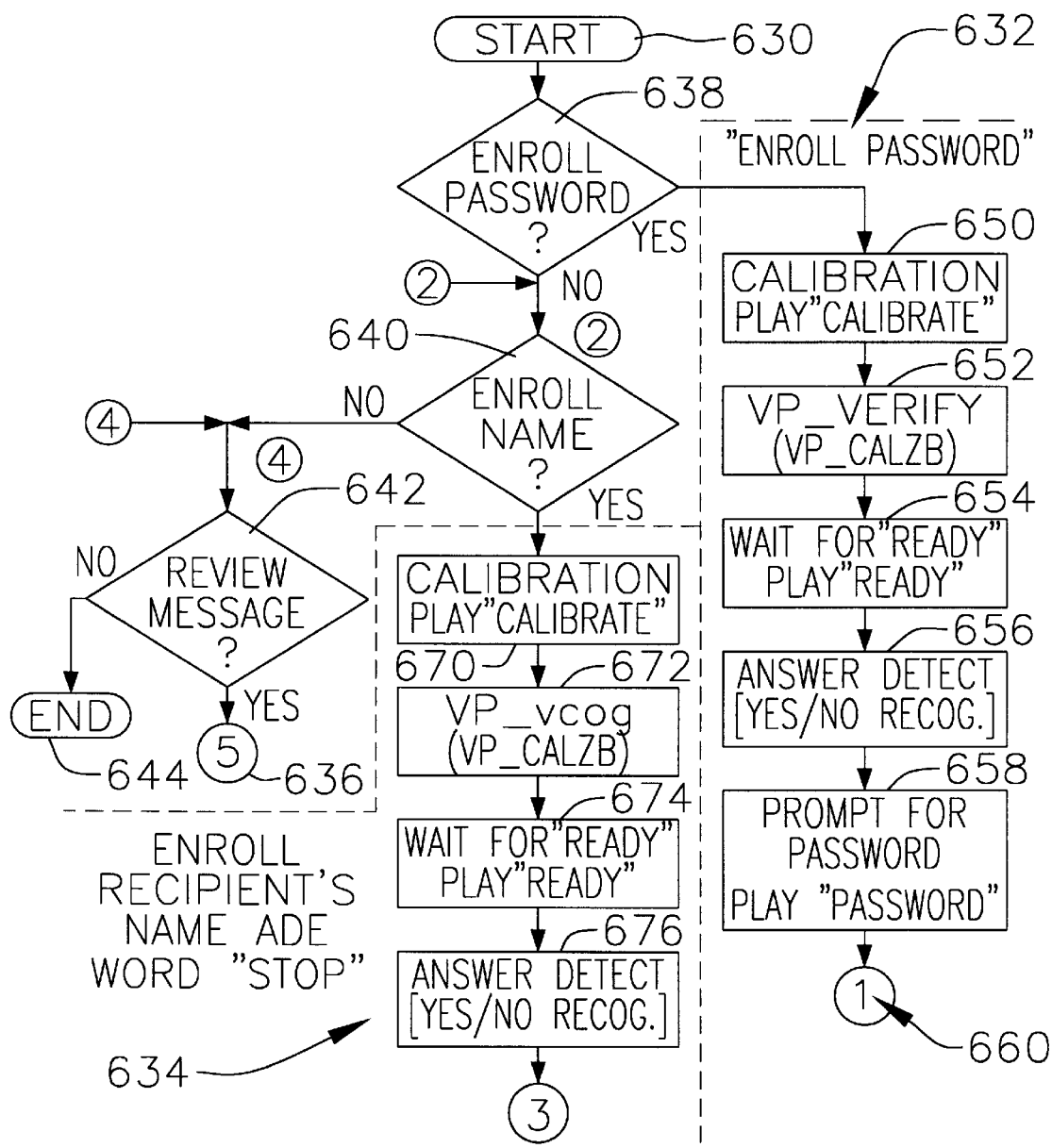

The preferred embodiment operates according to the logical flow of FIGS. 6a to 9b. Referring first to FIG. 6a, the method begins when the DSP enters block 630, which is the DSP processes at the beginning of a new call from a subscriber to the VMS. Start block 630 preferably comprises functions such as port initialization, data structure initialization, threshold initialization, and template loading. Thereafter the DSP tests, in block 638, whether the subscriber wishes to enroll a new password. Block 638 preferably uses the code of the "enrollpassword" function. If the test of block 638 is true then the DSP enters an enroll password mode 632. If false, then in block 640 the DSP tests whether the subscriber wishes to enroll a new message recipient's name and the word "stop" for use in message playback. If the test of block 640 is true then the DSP enters an enroll recipient's name and word stop mode 634 of FIG. 6a. If false then control passes to block 642, in which the DSP tests whether the subscriber wishes to review (i.e. playback) stored messages from other subscribers. If true then the DSP enters a review message mode 636 of FIG. 7a. If false then control passes to block 644 in which the DSP performs further voice mail functions or disconnects the subscriber.

1. Enroll Password Mode 632 a. General

Enrollment is a process used to train the VMS to recognize the subscriber's voice and to generate the subscriber's reference HMM (template). Thus enrollment comprises recording a digital representation of features of a representative digitized utterance called a template. In the preferred embodiment of the present invention, the enrollment process is automated so that no DTMF entry is needed to create a password enrollment template. According to the invention, the accomplish enrollment, the VMS plays a prompt (such as "speakpw.v" in the above list) to tell the subscriber to speak a password. In one preferred embodiment, the VMS prompt instructs the subscriber to speak the password a plurality of times, each time after a tone. The VMS waits for the subscriber to speak a password and detects the end of the password by sensing silence. The VMS then immediately generates the next tone and continues.

Figure 6B:
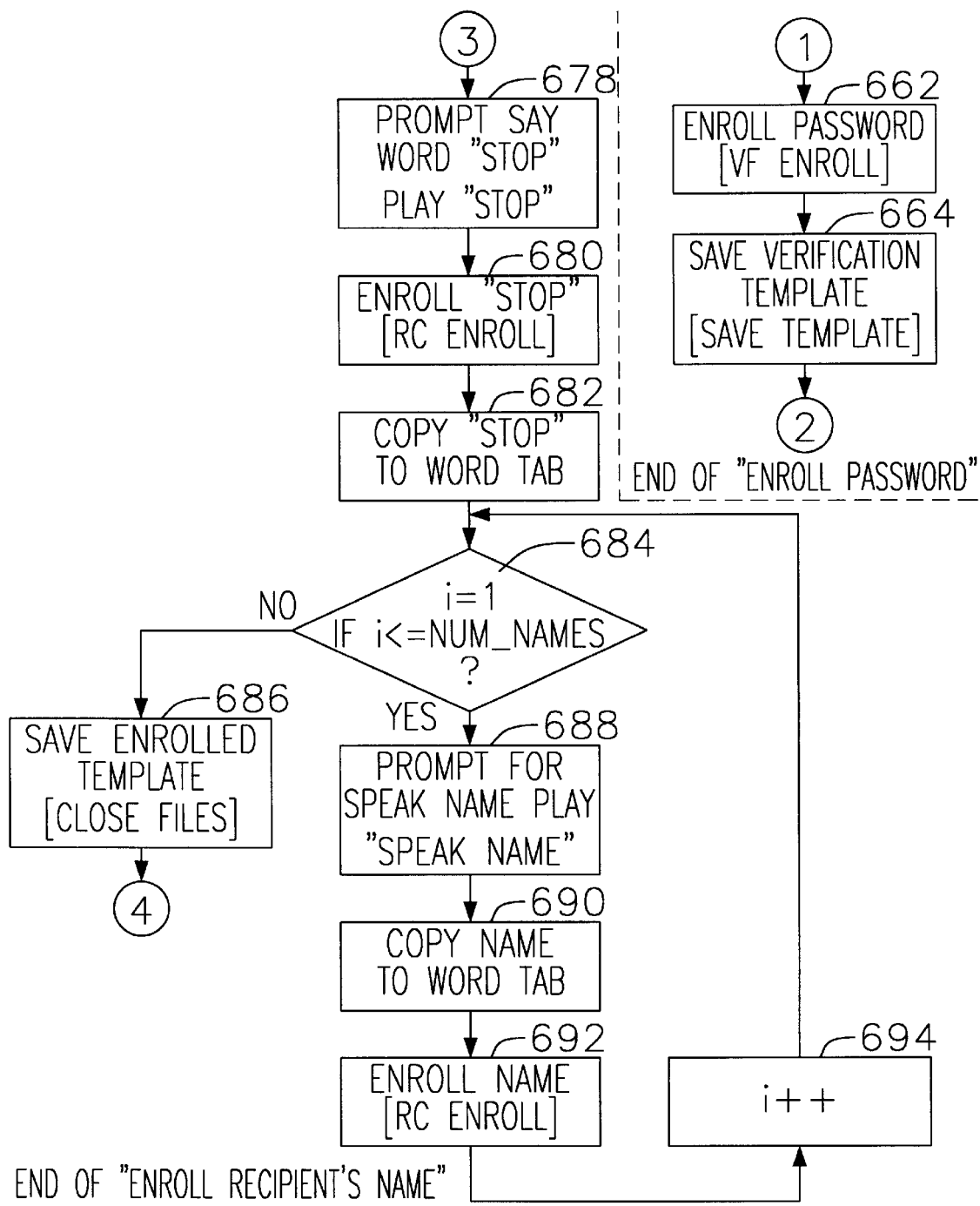

Enrollment is preferably accomplished using a self-testing procedure with the logical flow of FIGS. 6a and 6b. Self-testing occurs during enrollment and results in guaranteed verification of the password under similar line conditions. In one preferred embodiment, the VMS requires the subscriber to speak the password eight times. The first five are used to create the template, and the last three are used to test the template. The testing is performed using the same general computational steps used when a subscriber is trying to access a mailbox ("mailbox login"). However, the testing is done at a higher "confidence level" than that used during mailbox login. A higher confidence level means that a closer matching criteria is applied by the system, resulting in a lower acceptance rate for imposters. By using a higher confidence level during enrollment testing, the VMS effectively "teaches" the subscriber how to speak the password consistently so that after enrollment, the subscriber will always gain entry to a desired mailbox. This also improves the security value of the password.

Preferably all important system variables and parameters are re-configurable. These variables include (1) the number of entries used to make the template, (2) the number of entries used to test the template, (3) the confidence level to be used during enrollment template testing, and (4) the confidence level used for password verification during mailbox login.

One of skill in the art will recognize that increasing the value of variable (1) causes the template to be more accurate. Decreasing the values of variables (1) and (2) shortens the enrollment procedure. Increasing the value of variable (3) causes template creation to be more difficult, but the resulting template is also harder to impersonate. Increasing the value of variable (4) makes it harder for imposters to match the template, but also makes it harder for a subscriber to complete mailbox login.

Preferably the VMS is provided with means for giving interactive assistance to a subscriber during enrollment. If the subscriber is having difficulty creating a valid template, assistance is offered. Preferably four types of assistance are given. If the user fails to successfully match a template just created, then the system plays back messages advising the subscriber how to improve consistency. If the subscriber waited too long before speaking, e.g. more than five seconds, a warning message is played back. If the subscriber spoke a password which is too long, another warning message is given. If the subscriber pressed a DTMF button or caused "talk-off" (spoken sounds which sound like DTMF tones), a third type of warning message is played.

To implement subscriber assistance, the method of the invention provides several different error conditions. For example, the invention can report utterance duration and confidence level, and also indicate "utterance too short," "utterance too long," "not loud enough," "bad match," and "non speech."

In the preferred embodiment, the VMS is provided with a plurality of verbal pre-recorded voice prompts, stored on the disk drive 38. Each prompt is indexed with either a file name or a prompt number, and can be replayed by the VMS under control of a stored program. A preferred set of prompts is shown in Tables 1(a), 1(b), 1(c), 2(a), and 2(b):

TABLE 1(a)

| Voice Prompt Set | |
| --- | --- |
| File Name | Content of Prompt |
| calibrate.v | "Please remain silent after the tone." |
| erase.v | "Do you want to erase this message? Please say yes or no after the tone." |
| firstnew.v | "First ; new message. From-" |
| first save.v | "First ; saved message. From-" |

TABLE 1(a)-continued

Voice Prompt Set

| File Name | Content of Prompt |
|---|---|
| from.v | "From-" |
| header1.v | [Person 1's name] |
| header2.v | [Person 2's name] |
| header3.v | [Person 3's name] |
| message1.v | [Person 1's message] |
| message2.v | [Person 2's message] |
| message3.v | [Person 3's message] |
| messerase.v | "Message erased." |
| messsave.v | "Message saved." |
| msgsent.v | "Message sent." |
| namereject.v | "The recipient's name has not been recognized." |
| number.v | "You have two new messages and one saved message." |
| password.v | "Please speak your password after each tone." |
| ready.v | "Please say YES when you are ready to begin enrollment." |
| recipname.v | "Please say the recipient's name after the tone." |
| recmsg.v | "Please record your message after the tone." |
| reject.v | "Your password has been rejected. Goodbye." |
| repeat.v | "Your voice has not been recognized. Please say yes or no again." |
| review.v | "Do you want to review your messages? Please say yes or no at the sound of the tone." |
| reviewmsg.v | "Do you wish to review your message? Please say yes or no after the tone." |
| reviewsave.v | "Do you wish to review your saved messages? Please say yes or no after the tone." |
| send1.v | "Sent at 9:15 am." |
| send2.v | "Sent at 9:55 am." |
| send3.v | "Sent at 10:23 am." |
| sendmessage.v | "Do you want to send a message?Please say yes or no after the tone." "Send a message?" |
| sensmsg.v | "Do you wish to send your message? Please say yes or no after the tone." |
| silent.v | [silence] |
| speakname.v | "After each tone, speak the name-" |
| speakpw.v | "Please speak your password after the tone." |
| stop.v | "Please say STOP after each tone." |
| timeout.v | "Goodbye." |
| name00–name09 | Names spoken to identify an individual (as in voice mail). |
| word00–word09 | Names spoken as they are to be entered into the recog template. |

TABLE 1(b)

Spoken password Enrollment Prompts

| Prompt No. | Content of Prompt |
|---|---|
| 0044 | Recording ERASED. |
| 0099 | You have entered too many invalid parameters. |
| 0797 | To enter a NUMERIC password, press ONE. To record a SPOKEN password, press TWO. |
| 0798 | To establish a spoken password you need to record your password several times. Please SPEAK your password in your normal voice keeping it the same each time. To CANCEL all recordings and start over, press STAR. |
| 0801 | Your spoken password has been accepted, and is now enabled. |

TABLE 1(b)-continued

Spoken password Enrollment Prompts

| Prompt No. | Content of Prompt |
|---|---|
| 0920 | You must now record your password . . . |
| 0921 | . . . times. Please SPEAK your password after EACH tone. |
| 0980 | The last recording was too LONG. Please try again. |
| 0982 | Your new spoken password has not been recognized by Voice Mail. Try using a word with stronger syllables. Or pronounce your spoken password more clearly. If your spoken password is a phrase, leave no silence between words. |
| 0989 | Passwords MUST be between ONE and TWO seconds in length. A word or phrase with four strong syllables works well. Do not leave any silence between password phrases. |
| 01485 | To ENABLE your spoken password, press ONE. |
| 01484 | To DISABLE your spoken password, press TWO. |
| 01486 | To record a NEW spoken password, press FIVE and follow the instructions. |
| 01487 | To record a spoken password, press FIVE and follow the instructions. |
| 01488 | Your spoken password is now ENABLED. |
| 01489 | Your spoken password will remain ENABLED. |
| 01490 | Your spoken password is now DISABLED. |
| 01491 | Your spoken password will remain DISABLED. |
| 01492 | A spoken password cannot be recorded at this time due to system failure. |
| 01493 | You may not press keys during this process. Just speak your password after each tone, and wait for the next tone or prompt. |
| 01507 | Your ORIGINAL spoken password is still ENABLED. |

TABLE 1(c)

Spoken Password Mailbox Login Prompts

| Prompt No. | Content of Prompt |
|---|---|
| 0100 | Please dial your password and press POUND. |
| 0795 | Please SPEAK your password, after the tone. Or DIAL your password and press POUND. |
| 0127 | Please dial your MAILBOX NUMBER and press POUND. Or press STAR to CANCEL and RE-DIAL your PASSWORD. |
| 0214 | Your PASSWORD does NOT match your MAILBOX NUMBER. |
| 0753 | Please enter your mailbox EXTENSION number and press POUND. Or press STAR to CANCEL and RE-DIAL your mailbox ID number. |
| 0757 | Your PASSWORD does not match your mailbox ID or mailbox extension number. |

TABLE 2(a)

Standard Message 3001

| Msg No. | Content |
|---|---|
| 0223 | To change your password, press ONE. |
| 0224 | To set up or remove a guest mailbox, press TWO. |
| 0225 | To change instruction length, press THREE. |
| 0226 | To select outcall options, press FOUR. |
| 0227 | To select paging options, press FIVE. |

TABLE 2(b)

Brief Message 3001

| Msg No. | Content |
|---|---|
| 0218 | For password, press ONE. |
| 0219 | For guest mailboxes, press TWO. |
| 0220 | For instruction length, press THREE. |
| 0221 | For outcall options, press FOUR. |
| 0222 | For paging options, press FIVE. |

Logical flow of the enroll password mode 632 is shown in detail in FIGS. 6a and 6b. Preferably the mode is implemented using the function "enrollpassword", and other functions called by "enrollpassword" and described below. In block 650 the DSP calibrates the subscriber's voice port by playing a pre-recorded message such as "please remain silent after the tone." In block 652 the DSP executes the "VP_verify" function with the parameter VP_VCALIB.

b. Calibration of Spoken Password

As is known in the art, before password verification occurs, each voice port must be calibrated to filter out background noise. However, in the preferred embodiment, port calibration is imperceptible to users. Preferably calibration is carried out once on each call before enrollment or verification. Users perceive only a brief pause before enrollment instructions are given.

The preferred embodiment provides a calibration method which both measures and compensates for ambient noise, and build the silence model of HMM. The silence model is factored into a subscriber's reference template during enrollment. Alternatively, the silence model is factored into the test input at verification time.

Detailed descriptions of hidden Markov models as implemented in the prior art can be found in the following publications, the contents of which are hereby incorporated by reference: Itakura et al., "Distance measure for speech recognition based on the smoothed group delay spectrum", IEEE Conf. on Acoustics, Speech and Signal Processing (ICASSP), IEEE, 1987, pp. 1257–1260; Poritz, "Hidden Markov models: a guided tour" ICASSP, IEEE, 1988, pp. 7–13; Wilpon et al., "Automatic recognition of keywords in unconstrained speech using HMM's", IEEE Trans. on Acoustics, Speech & Signal Processing (ASSP), v 38 n 11, November 1990, pp. 1870–1878; Bellegarda et al., "Tied mixture continuous parameter modeling for speech recognition", IEEE Trans, on ASSP, v 38 n 12, December 1990, pp. 2033–2045; Savic et al., "Variable parameter speaker verification system based on hidden Markov modeling", ICASSP 1990, pp. 281–284; Rabiner, "A tutorial on HMM's and selected applications in speech recognition", Proc. IEEE v 77 n 2, February 1989, pp. 257–286; Schwartz et al., "Robust smoothing for discrete HMM's", ICASSP 1989, pp. 548–551; Velius, "Variants of cepstrum based speaker identity variation", ICASSP 1988, pp. 583–586; Murthy, "Speech processing using group delay functions", Signal Processing Mar. 1, 1991, pp. 259–267; Meyer et al., "Design and evaluation of optimal cepstral lifters for accessing articulatory codebooks", IEEE Trans. on Signal Processing v 39 n7 July 1991, pp. 1493–1502; Wang Ren-hua et al., "A weighted distance measure based on the fine structure of feature space: application to speaker recognition", ICASSP 1990, pp. 273–276; Naik et al., "Speaker verification over long distance telephone lines", ICASSP 1989, pp. 524–527; Murthy, "Formant extraction from phase using weighted group delay function", Electronics Letters November 9, 1989, pp. 1609–1611; Wilbur et al., "Consistent speaker identification via Wigner smoothing techniques", ICASSP 1988, pp. 591–594; Yuan-cheng Zheng et al., "Text-dependent speaker identification using circular HMM's", ICASSP 1988, pp. 580–582; U.S. Pat. Nos. 4,989,249 Oka et al.; 4,903,305 Gillick et al.; 4,852,172 Taguchi; 4,829,574 Dewhurst et al.; 4,264,959 Blass; 4,227,177 Moshier; and 4,076,960 Buss et al.

The invention also provides means for filtering a voice response to separate noise and to cope with a varying input which does not exactly match a template. Noise can include background noise such as car noise or other speakers in the same room as the subscriber. Other noise sources include dirty fan lines, open windows, radios, and variances in performance of microphones used in telephone sets.

Preferably calibration is performed in about 720 ms, (about ¾ second) in contrast to prior art methods which require 2880 ms (2.88 seconds) or more.

As is known in the art, a hidden Markov model has two components: a finite-state Markov chain and the output probabilistic distributions which turn the state path into a time series. The most frequently used output probabilistic distributions are Gaussian or Laplacian functions. In the present invention, a novel spectral distance measurement method, based on the smoothed LPC group delay spectrum, gives a stable recognition performance under variable frequency transfer characteristics and additive noise.

Smoothing the group filter delay provides a method of improved performance with various microphones, telephone line impairments and with additive noise.

Itakura discusses the weighted smoothing function as a method to be robust to additive noise and telephone line impairment on page 1260:

"The smoothed group delay spectral distance measure is robust against acoustic environmental variations that affect the speech signal. also . . . the decreases in the recognition rate due to the carbon transmitter is small by using the smoothed group delay spectrum measure."

By using smoothed group delay weighting, the invention modifies the logarithmic Laplacian density function.

The smoothed group delay function is defined by Itakura on page 1257 and 1258 as:

$$G(n) = W(n) * C(n)$$

Where $G(n)$ are the weighted Fourier coefficients of the group delay spectrum, $W(n)$ are the weighting values, and $C(n)$ are cepstral coefficients of the original signal (which are defined as natural log of the amplitude spectrum coefficients)

Assuming a Laplacian density function allows $W(n)=n$, which is typical in prior art. Instead, Itakura suggests the more general form of $W(n)$:

$$W(n) = n^S * \exp(-n^2/2 * T^2)$$

Itakura claims on page 1257 in the abstract that using this weighting on the cepstral coefficients can result in improved voice recognition accuracy. Itakura advises the use of S=0 or 1 and T=8.

This invention modifies the smoothed group delay function in a manner similar to Itakura, using S=0 and T=8.

Weighted cepstral coefficients are used to measure the maximum likelihood function of the HMM.

In Rabiner, the general HMM is presented (pages 257 through 261). Rabiner summarizes the standard HMM model "H" on page 261, saying:

"for convenience, we use the compact notation H=(A, B, p)."

Then the HMM technique is applied to a limited word recognition system, which is described by Rabiner on page 276:

"In order to do isolated word speech recognition, we must perform the following. 1) for each word V in the vocabulary, we must build an HMM H(V), i.e. we must estimate the model parameters (A, B, p) that optimize the likelihood of the training set for the Vth word."

Rabiner then goes on to suggest using a sinusoidal weighting function for cepstral coefficients in the HMM (page 277):

"Cepstral Weighting: The Q-coefficient cepstral vector c(m) at time frame 1 is weighted by a window W(m) of the form:

$$W(m) = 1 + Q/2 * \sin(pi*m/Q)"$$

This invention uses the HMM techniques described by Rabiner, but substitutes the non-sinusoidal cepstral coefficient weighting function from Itakura (above in (1)) into the Rabiner-style HMM.

These methods reduce the degradation of recognition performance caused by sensitivity of different microphones.

The invention also uses higher order normalized cepstral coefficients and a large number of states of the HMM to characterize the acoustic variability of speakers. Unlike the prior art, in the method of the invention the order of cepstral coefficients is increased from 10th to 20th order, and the number of HMM states is increased from 10 to 14.

Veluis has conducted research into the relationship between order and speaker verification performance. On page 584, Velius states:

"The first experiment varied both frame length and analysis order over ranges typically found in the literature. The local distance measure used for this experiment was the squared Euclidean distance. The analysis orders tested were 10, 14, 20 and 30 . . . Performance improves with higher order spectral models for all but the extreme window sized in the 30th order analyses."

Velius goes on to show that increasing analysis order comes at increased computational cost (page 584).

This invention improves on prior art by increasing the order from 10 to 20. As per Velius, this results in improved performance. An order of 20th was used, since the computational cost of going to 30th order was prohibitive.

20th order allows spectral resolution to include pitch, which is desired in speaker verification (e.g. spoken password). Pitch information is not typically desired in general speech recognition.

Rabiner in Section E, page 278 states:

"The issue of the number of states to use in each word model leads to two schools of thought. One idea is to let the number of states correspond roughly to the number of sounds (phonemes) within the word—hence models with from 2 to 10 states would be appropriate. The other idea is to let the number of states correspond roughly to the average number of observations in a spoken version of the word . . . In this matter each state corresponds to an observational model interval—i.e., about 15 ms for the analysis we use."

Rabiner clearly shows the prior art of using a model of at most 10 states for isolated word recognition.

In this invention, the intent is a spoken password, which can consist of multiple words with a duration of up to about 2 seconds. To improve performance, the number of states was increased from 10 to 14 to better represent these longer spoken passwords. The specific choice of 14 states was made based on computational cost and estimates of the typical number of phonemes in a spoken password.

c. Enrollment

After calibration, the DSP plays a "ready" prompt in block 654, such as "please say YES when you are ready to begin enrollment." In block 656 the DSP waits to receive a "YES" response by calling the function "ynRecog". The "ynRecog" function uses a speaker independent template of the words YES and NO. If either "VP_verify" or "ynRecog" fail, the enrollPassword function terminates.

If YES is recognized then the DSP plays a "password" prompt in block 658, such as "please speak your password after each tone." Control is passed to block 662 of FIG. 6b in which the DSP receives a plurality of password utterances and creates a verification template. Block 662 is preferably a "VFenroll" function and the functions called therein. In block 664 the DSP saves the verification template preferably using "saveTemplate" function. This ends the enroll password mode and control is passed via state 2 to block 640 of FIG. 6a.

2. Enroll Password—Alternate Embodiment a. General

The spoken password feature of the present invention has three separate modes: calibration; enrollment, or initial entry of a password; and verification when a subscriber desires to access a voice mailbox. In an alternate embodiment of the invention all three modes are integrated with a voice mail application program such as the InfoMail application discussed above. In one preferred embodiment the application program operates according to the menu flow shown in FIG. 3 and the logical flow shown in FIGS. 4a to 4e, inclusive. FIGS. 4a to 4e show general states, prompts, and messages of an alternate embodiment.

Figure 3:
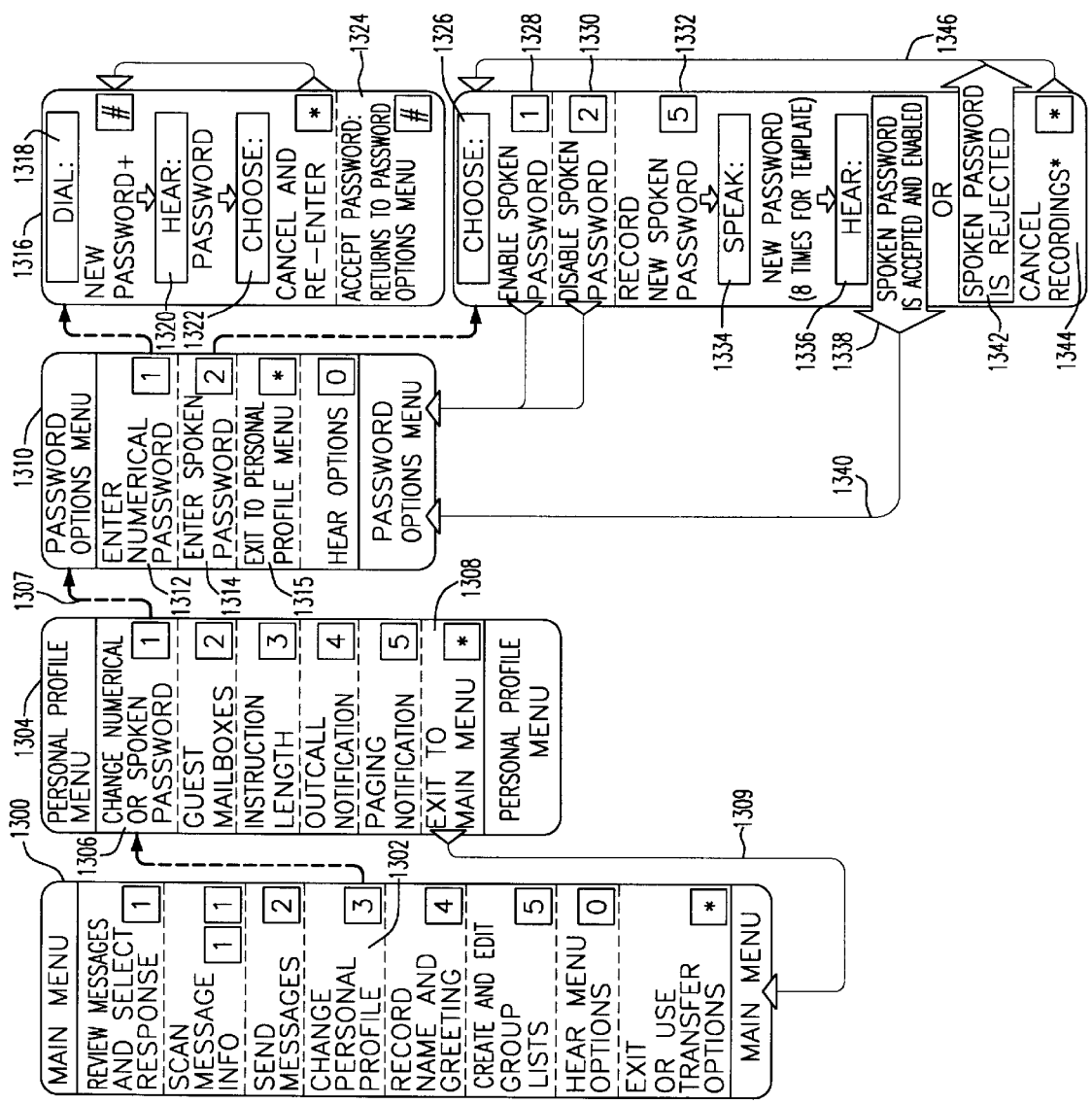
FIG. 3 is a block flow diagram of spoken password feature options in an alternate embodiment of the invention.

Referring to FIG. 3, a voice mail application program preferably includes at least three menus, namely a main menu 1300, a personal profile menu 1304, and a password options menu 1310. As is known in the art, a menu comprises a verbally spoken list of options stored by the VMS in a mass storage device such as disk drive 38. When a subscriber dials the VMS, the VMS answers by first playing back the main menu 1300. The main menu is implemented in a recording which says:

"To review messages, press 1. To scan message info, press one-one. To send messages, press 2" . . . and so forth for each option. A subscriber selects options by pressing the corresponding DTMF button on a telephone or by speaking digits.

The main menu 1300 includes a personal profile change option 1302 preferably accessed by pressing 3, which causes the VMS to play back a list of options in the personal profile menu 1304. If the subscriber presses the "*" button then the main menu is replayed as indicated by arrow 1309. A change password option 1306 is selected if the subscriber presses or says "1". As indicated by arrow 1307, the VMS next plays back the password options menu 1310, which has an enter numerical (DTMF) password option 1312 and an enter spoken password option 1314. If the subscriber presses "*" then the personal profile menu is replayed as indicated by exit option 1315.

Logical operation of the enter numerical password option 1312 is shown by reference number 1316. The subscriber is expected to dial DTMF digits for the password, terminated by a "#", as shown by the DIAL step 1318. Thereafter the VMS plays back the password, as shown by HEAR step 1320, preferably by synthesizing speech corresponding to the entered password digits and routing the synthesized speech to the subscriber's telephone handset. As shown by the CHOOSE step 1322, the VMS next plays prompts requesting the subscriber to cancel the password by pressing "*" or accept the password by pressing "#". If acceptance is chosen (reference number 1324) then the VMS plays back the password options menu 1310 and the subscriber can perform further functions.

If the enter spoken password option 1314 is selected then at a CHOOSE step 1326 the VMS plays a message instructing the subscriber to choose an enable spoken password option 1328, a disable spoken password option 1330, or a record spoken password option 1332. Both the enable spoken password option 1328 and disable spoken password option 1330 operate like toggle switches to cause the VMS to either turn password use on or off.

b. Enrollment of Spoken Password

If the record new spoken password option 1332 is selected, then at a SPEAK step 1334 the VMS prompts the subscriber to speak a new password into the telephone. This step constitutes the enrollment mode discussed in detail below. After receiving a spoken password, the VMS plays back the password in the HEAR step 1336. If the password is acceptable to the VMS, as discussed below, then a confirming message is played at step 1338 and the password options menu is replayed as shown by arrow 1340. If the password is rejected by the VMS as shown at step 1342, as discussed below, then the enrollment process is repeated as indicated by arrow 1346.

Figure 4A:
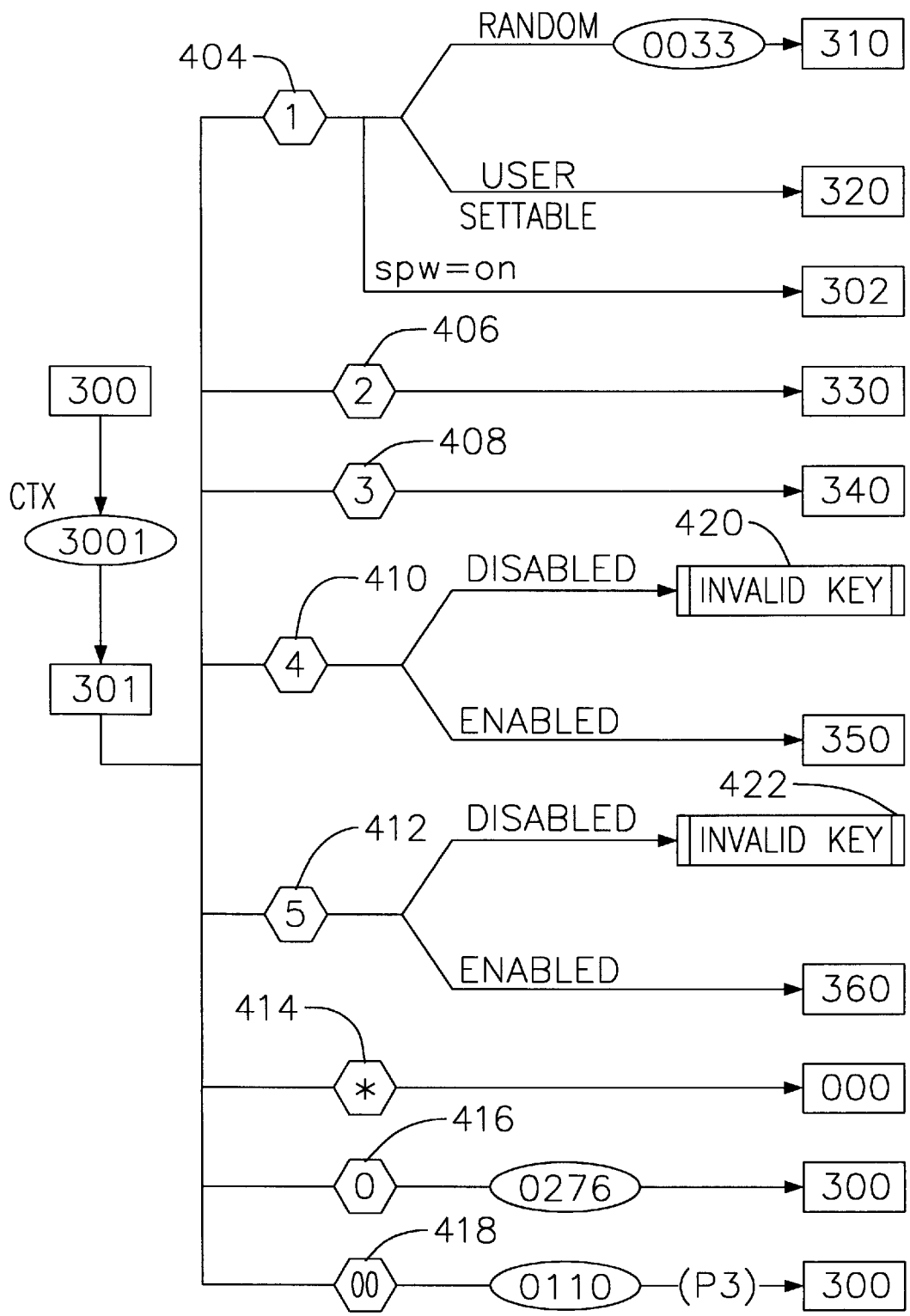

FIG. 4a shows logical flow of the personal profile menu 1304. State 300 of FIG. 4a is entered when a subscriber selects the change personal profile option 1302 from main menu 1300 of FIG. 3. Message 3001 is played back and contains a list of options. Message 3001 comprises a plurality of menu messages shown in Tables 2(a) and 2(b) and varies depending on the VMS context. If the context is STANDARD, then the VMS plays back the messages shown in Table 2(a). If the context is BRIEF then the Table 2(b) messages are played.

After playback of message 3001, state 301 is entered in which the VMS waits for the subscriber to press a DTMF digit. In an alternative embodiment the VMS waits for the subscriber to speak a digit. States 404 to 414 correspond to options of the personal profile menu 1304 shown in FIG. 3. For example, state 414 indicates that when a subscriber presses "*", control is passed to state 000 which is the beginning of the main menu 1300. States 406 to 422 do not relate to spoken password use and are not discussed in detail in this section.

When the subscriber presses or speaks "1", state 404 is entered which corresponds to the change numerical or spoken password option 1306 of FIG. 3. A three-way branch occurs to state 310, 320 or 302 as shown in FIG. 4a. If the subscriber is currently using spoken password capability ("spw=on") then the VMS enters state 302, discussed below.

Otherwise, a DTMF password is produced, and the password options menu 1310 of FIG. 3 is skipped. If the subscriber has the capability of setting his own DTMF password, then the VMS enters state 320. Otherwise, the VMS assigns a DTMF password using a random number, which is reported to the subscriber in message 0033.

Figure 4B:
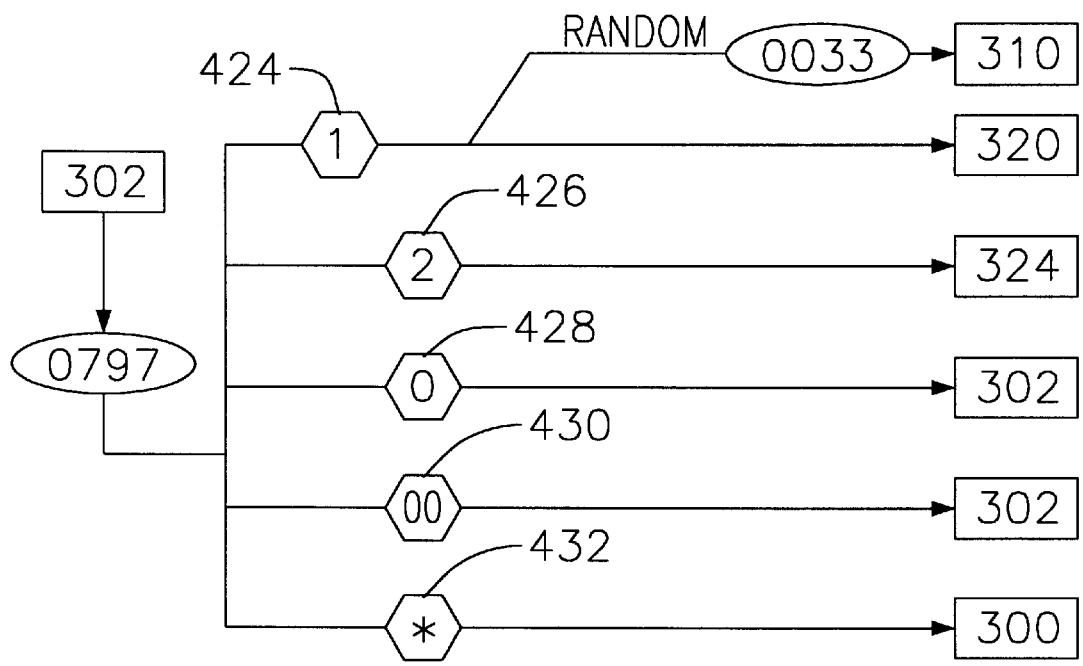
Figure 4C:
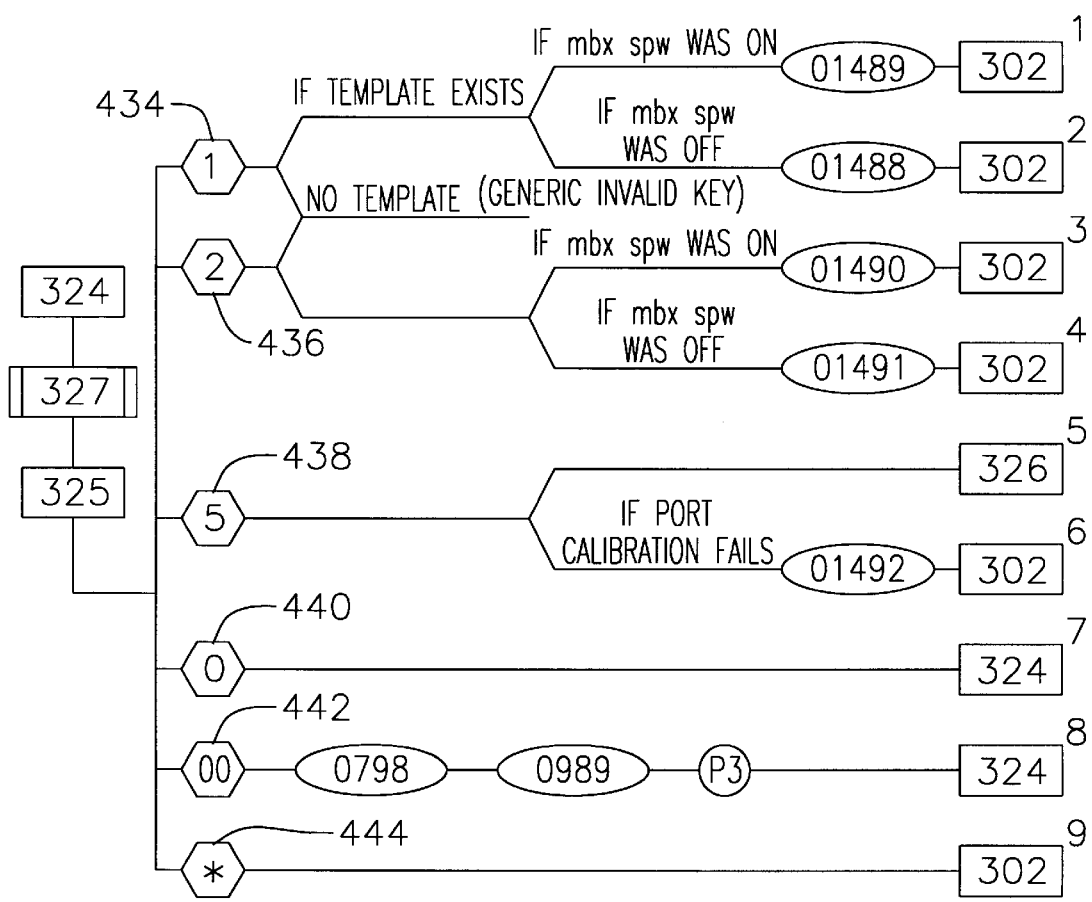
Figure 4E:
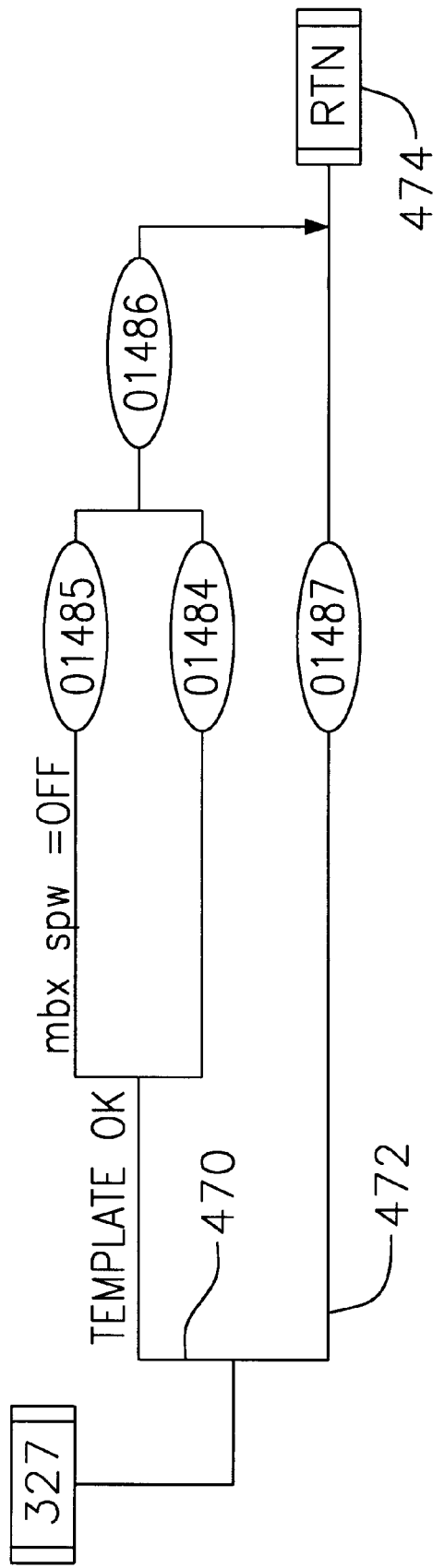

VMS processing in state 302 is shown in FIG. 4b. Message 0797 is played which contains a verbal listing of options 1312 to 1315 of the password options menu 1310. States 424 to 432 correspond to options 1312 to 1315. As shown in FIG. 4b, after hearing message 0797, if the subscriber presses "*", then the VMS enters state 300, i.e. returns to the personal profile menu 1304 described above. If the subscriber presses "0" or "00" then the VMS returns to state 302 and the password options menu is replayed.

If the subscriber presses "1" (state 424) then DTMF password processing is done as described above for option 1312. If the subscriber presses "2" (state 426) then the VMS enters state 324, which initiates processing of a spoken password and is shown in detail in FIG. 4c. Subroutine 327 is called to selectively play messages reciting the enable, disable, and record steps 1328, 1330, and 1332 of FIG. 3. Subroutine 327 uses the logical flow of FIG. 4e. The VMS tests whether the subscriber's spoken password template is properly recorded. If not, then the subscriber cannot enable or disable a password, so the VMS follows branch 472 of FIG. 4e and plays back only message 01487, which recites the record password option. If a template is found, then branch 470 is followed and the VMS then tests whether the spoken password is disabled ("mbx spw=OFF"). If so, then message 01485 is played which recites the enable password option. Otherwise (spoken password is enabled) the VMS plays message 01484 which recites the password disable option. Then the VMS plays message 01486 to recite the record new password option. Thereafter the VMS enters state 474 and returns from subroutine 327.

Referring again to FIG. 4c, the VMS next enters state 325 to calibrate the subscriber's voice port. The VMS then waits for the subscriber to press a DTMF digit or say a digit and branches to one of states 434 to 444 of FIG. 4c. States 434 to 438 correspond to steps 1328 to 1332 of FIG. 3. If the subscriber presses "0" (state 440) then the VMS returns to state 324 to initiate the spoken password mode again. If the subscriber presses "00" (state 442) then the VMS plays warning messages 0798 and 0989 and returns to state 324. If the subscriber presses "*" (state 44 which corresponds to step 1344 of FIG. 3), then the VMS enters state 302 and the password options menu is replayed.

If the subscriber presses "5" (state 438) and calibration was successful, then the VMS enters state 326 to enroll a password, as described below. If calibration failed, then a password cannot be recorded properly, so a warning message 01492 is played and the VMS enters state 302 described above.

If the subscriber presses "1" (state 434) to execute the enable spoken password option 1328 of FIG. 3, then the VMS tests whether an enrolled password template exists. If not, then the VMS plays a warning message and returns to the password options menu 1310. If a template exists, then the VMS tests whether spoken password service is currently enabled. If so, then a warning message 01489 is played; otherwise a confirming message 01488 is played and the VMS returns to state 302 described above.

If the subscriber presses "2" (state 436) to execute the disable spoken password option 1330 of FIG. 3, then the VMS again tests whether an enrolled password template exists. If not, then the VMS plays a warning message and returns to the password options menu 1310. If a template exists, then the VMS tests whether spoken password service is currently disabled. If so, then a warning message 01490 is played; otherwise a confirming message 01491 is played and the VMS returns to state 302 described above.

Spoken password recording is processed by the VMS using the logical flow of FIG. 4d. After state 326 is entered the VMS plays back message 0920 followed by a synthesized number in state 450 and message 0921. These three elements result in a message such as "Please speak your password eight times," wherein "eight" is the synthesized number of state 450. The VMS then calibrates the subscriber's port by entering state 327 of FIG. 4d. The VMS is set to record mode in state 452 and waits for input from the subscriber in state 454. As input utterances are received they are digitally sampled and recorded in the data store 74. The VMS senses the end of input by waiting for a silent interval after a spoken utterance. Then the recorded input is tested and the VMS enters either state 456, 458, 460, 462, or 464. If a good recording was received (state 456) then the VMS returns to state 327 of FIG. 4*d* to receive another password instance. This process is repeated several times as indicated by the number in state 450.

If the user pressed "0" (state 458), then warning messages 0798 and 0989 are played and the VMS returns to state 324, i.e. the password options menu. If the user pressed "*" to cancel recording a password, then a warning message 0044 is played and the VMS returns to state 324.

If the recorded password failed one of several integrity tests, or if unintelligible DTMF digits were sensed (state 462), then an error is signaled with an error tone in state 463. Depending on the type of failed test, a multiway branch is made as shown at reference number 466. The VMS attempts to assist the subscriber by playing back one of several advisory messages. If the subscriber has failed too many times to record a password, then messages 0099 and 01507 are played and the VMS enters state 302, i.e. returns to the password options menu. If the recording failed to match a prior recording ("bad match"), comprised silence, was too long, or had another type of error, then the VMS plays back messages 0982, 0989, 0980, or 0982, respectively. If the recording comprises DTMF tones for the digits 1 to 9 or "#", then the subscriber is advised that such digits are not permitted as a spoken password, through messages 01493, 0798, and 0989. After each error condition the VMS enters state 324 to begin spoken password entry again.

c. Verification of Spoken Password

Figure 5A:
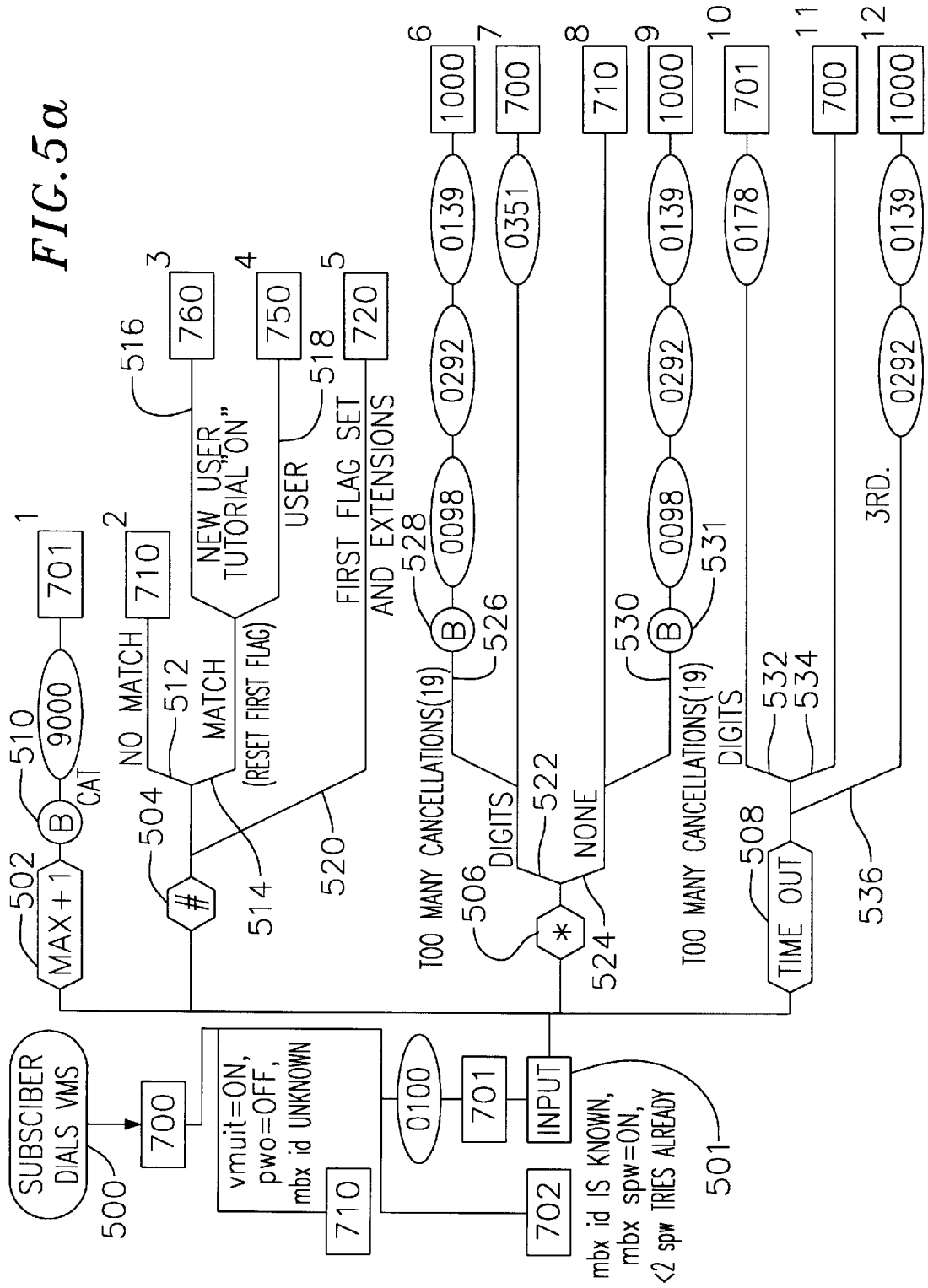

Referring to FIGS. 5*a* to 5*d,* verification forms one state in a process used by a subscriber to gain access to the subscriber's voice mailbox on the VMS. The process of FIGS. 5*a* and 5*d* is described in detail below.

As shown in FIG. 5*a,* verification occurs after a subscriber initially dials the VMS in state 500. In state 500 the VMS performs system functions well known in the art, such as initializing a voice port, assigning the port to one of the DSPs on a LIC, and playing back an initial greeting. In state 700 the assigned DSP waits for the subscriber to enter a mailbox identification number ("mbx id" [ID]), which preferably is a string of DTMF digits. After the ID is received, the DSP tests whether the id is known by the VMS, preferably by comparing the ID to a look-up table stored in the data store or on the disk drive 38. If the ID is unknown, then control is passed to state 710 which is shown in detail in FIG. 5*c* and described below.

If the ID is known then the DSP tests whether spoken password service is currently enabled for the identified mailbox ("mbx spw=on"), and also whether the subscriber has attempted to enter a spoken password fewer than two times ("<2 spw tries already"). If these tests are affirmative then control passes to state 702, shown in detail in FIG. 5*b* and described below.

If spoken password service is not currently enabled, then message 0100 is played to prompt the subscriber to enter a DTMF password. In state 701 of FIG. 5*a* the DSP waits for DTMF digits to be pressed or for a timeout to occur. The input received is tested in state 501, and the DSP then branches to one of four states 502, 504, 506, or 508. If the subscriber pressed one too many digits ("Max+1"), then state 502 is reached. The DSP generates an error tone in state 510 and plays an explanatory message 9000, such as "too many digits entered." Then control passes back to state 701 to await another entry.

If the subscriber presses "#", then state 504 is reached. This process assumes that the subscriber also entered a series of digits before the "#" entry. Thus, in state 504, the DSP tests whether a proper set of digits were entered. If not, then control is passed on branch 520. On this branch a FIRST flag is set to indicate that the subscriber has made an erroneous entry for the first time; then control passes to state 720. If proper digits were entered, then the DSP compares the entered digits to the subscriber's DTMF password stored in the data store 74 or on the disk drives 38. If no match is made, then control passes on branch 512 to state 710 in which the subscriber can enter a mailbox number. If a match is made, then on branch 514 the FIRST flag is reset and the DSP tests whether a "Tutorial" flag is set on to indicate that the subscriber is unfamiliar with the VMS and desires tutorial information. If the Tutorial flag is ON then control passes on branch 516 to state 760 in which tutorial messages are played back. Otherwise control passes on branch 518 to state 750 in which the subscriber can perform any desired voice mailbox function. State 750 is not described in detail herein but it preferably includes the functions described in the above-noted reference manuals of Digital Sound Corporation.

State 506 is reached when the subscriber presses "*" on the telephone keypad to cancel entry of a DTMF password. In state 506 the DSP tests whether any digits were entered before the "*" and also tests how many cancellations have been requested before. If digits were received then control passes to branch 522. If too many prior cancellations have been made, e.g. more than 19 cancellations, then control passes on branch 526 to state 528 in which an error tone is played. The DSP then plays warning messages 0098, 0292, and 0139, and then branches state 1000 in which the subscriber is disconnected from the VMS. If fewer than 19 cancellations have occurred then a warning message 0351 is played and control is passed back to state 700 to enable the subscriber to try again.

If no digits were received before the "*", then control is usually passed to state 710 to receive entry of a mailbox number. If too many prior cancellations have been made, e.g. more than 19 cancellations, then control passes on branch 530 to state 531 in which an error tone is played. The DSP then plays warning messages 0098, 0292, and 0139, and then branches state 1000 in which the subscriber is disconnected from the VMS.

State 508 is reached when a timeout occurs, i.e. no response is sensed in state 701 for a predetermined period of time such as five seconds. In state 508 the DSP tests whether any DTMF digits were received before the timeout and also whether two previous timeouts have occurred. If two previous timeouts have occurred then control is passed on branch 536 in which the DSP plays warning messages 0292 and 0139. Then the subscriber is disconnected in state 1000. If no digits were received then control passes on branch 534 back to state 700, causing the DSP to prompt the subscriber to enter a password again. If one or more digits were received before the timeout then control passes on branch 532 in which the DSP plays warning message 0178 and then returns to state 701 to wait for entry of a new DTMF password.

Figure 5B:
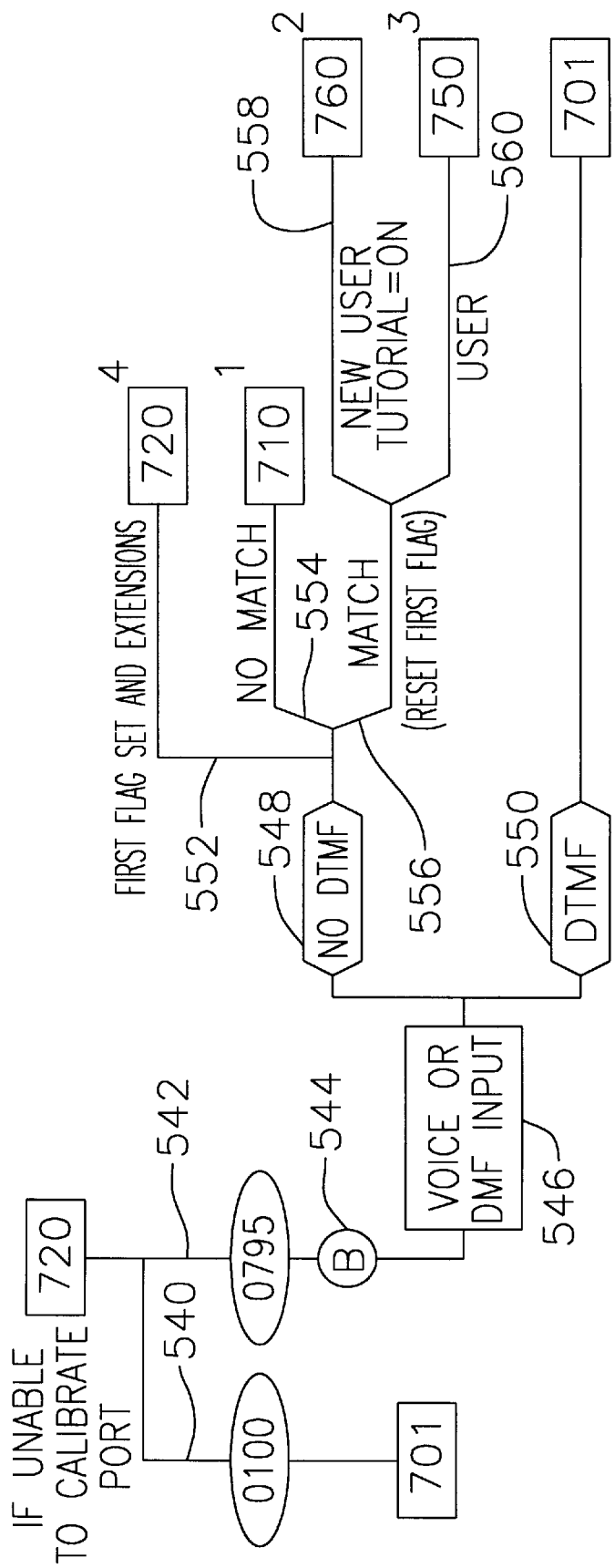

Referring now to FIG. 5*b,* spoken password entry is processed starting at state 702 which is reached when, as noted in FIG. 5*a,* the subscriber's mailbox ID is recognized, spoken password service is set on, and fewer than two attempts to enter a spoken password have been made. In state 702 the DSP attempts to calibrate the subscriber's voice port as described above. If the DSP is unable to calibrate properly then control passes on branch 540 in which the DSP plays back a warning message 0100. The DSP then passes control to state 701 to require the subscriber to enter a DTMF password or exit the system.

Branch 542 is reached if calibration is successful. The DSP plays a prompt message 0795 and then generates a "ready" tone in state 544. In state 546 the DSP waits for a voice utterance or a DTMF digit to be pressed, and tests whether voice or DTMF digits were received. If DTMF digits were received, state 550, then control is passed to state 701 which processes a DTMF password as described above. Thus, this process enables the user to enter either a spoken password or a DTMF password with proper automatic processing and verification of either type of password. In particular, the process properly handles a DTMF password entered when the process is "expecting" a voice password.

If no DTMF digits are detected then state 548 is entered to process a voice utterance by the subscriber. As described in detail below, the DSP generates a hidden Markov model template for the utterance and compares the input template to the subscriber's stored template which was generated in the enrollment mode described above. In one preferred embodiment the DSP is also provided with means, in a subroutine of a stored program, to provide a subscriber with access to a mailbox extension. If extension service is enabled then control is passed on branch 552 to state 720 (not shown in detail) to process access to a mailbox extension.

If a template match fails in state 548 then control is passed on branch 554 to state 710, in which the DSP processes entry of a mailbox ID number. If a match is made then control passes on branch 556 in which the DSP tests whether the subscriber is a new user, i.e. whether Tutorial is set ON. If so, then control passes on branch 558 to state 760 in which tutorial messages are played. Otherwise control passes on branch 560 to state 750 in which the subscriber can perform any desired voice mail function.

Figure 5C:
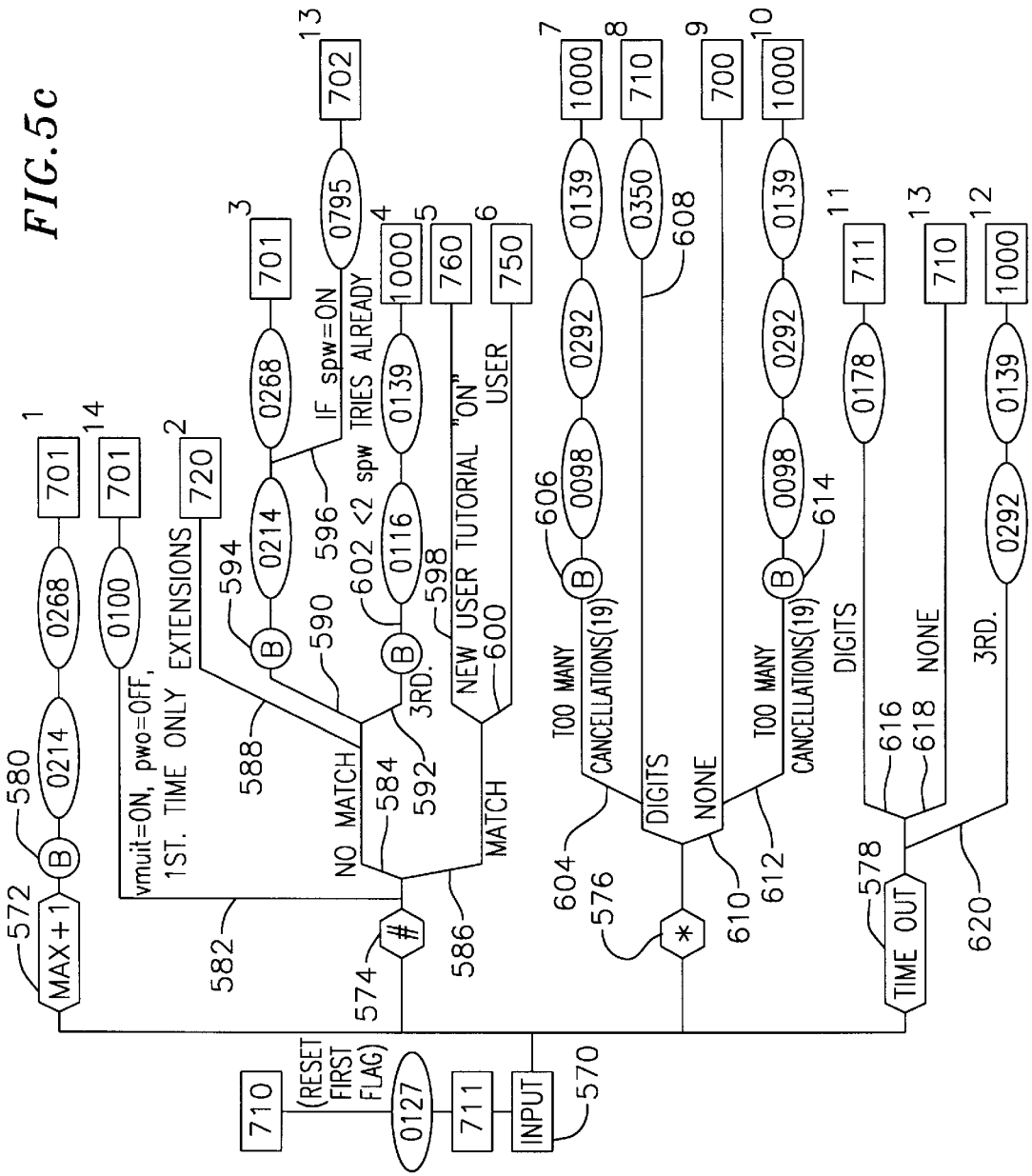

Referring now to FIG. 5c, state 710 is reached to process subscriber input of a mailbox ID. Message 0127 is played to prompt the subscriber to enter DTMF digits for a mailbox ID. In state 711 the DSP waits for DTMF digits to be pressed or for a timeout to occur. The input received is tested in state 570, and the DSP then branches to one of four states 572, 574, 576, or 578. If the subscriber pressed one too many digits ("Max+1"), then state 572 is reached. The DSP generates an error tone in state 580 and plays explanatory messages 0214 and 0268 such as "too many digits entered." Then control passes back to state 701 to await another entry.

If the subscriber presses "#", then state 574 is reached. This process assumes that the subscriber also entered a series of digits before the "#" entry. Thus, in state 574, the DSP tests whether a proper set of digits were entered. If not, then control is passed on branch 582. On this branch a FIRST flag is tested to determine that the subscriber has made an erroneous entry for the first time. If so, then message 0100 is played and control passes to state 701. If proper digits were entered, then the DSP compares the entered digits to the subscriber's DTMF mailbox id stored in the data store 74 or on the disk drives 38. If no match is made, then control passes on branch 584. On this branch the DSP tests whether mailbox extension service is enabled and if so, branch 588 is taken to state 720. If extension service is disabled then the DSP tests whether three failed matches have occurred. If so, then branch 592 is taken to state 602 in which the DSP plays an error tone followed by warning messages 0116 and 0139. Then the subscriber is disconnected in state 1000. If fewer than three failed matches have occurred then branch 590 is taken to state 594, in which the DSP generates an error tone and then plays warning message 0214. Next the DSP tests whether spoken password service is enabled and if so, branch 596 is taken, in which the DSP prompts the subscriber to enter a spoken password, which is then processed via state 702.

As described above with reference to FIG. 5b, branch 596 of state 710 can be reached on branch 554 after a failed spoken password match test followed by a failed mailbox id entry. Thus, this process is structured to require a subscriber to successfully enter both a spoken password and a mailbox ID, and to permit successful entry of one even if entry of the other initially fails.

If mailbox id match is made, then on branch 586 the DSP tests whether a "Tutorial" flag is set on to indicate that the subscriber is unfamiliar with the VMS and desires tutorial information. If the Tutorial flag is ON then control passes on branch 598 to state 760 in which tutorial messages are played back. Otherwise control passes on branch 600 to state 750 in which the subscriber can perform any desired voice mailbox function. State 750 is not described in detail herein but it preferably includes the functions described in the above-noted reference manuals of Digital Sound Corporation.

State 576 is reached when the subscriber presses "*" on the telephone keypad to cancel entry of a DTMF password. In state 576 the DSP tests whether any digits were entered before the "*" and also tests how many cancellations have been requested before. If digits were received then control passes to branch 608. If too many prior cancellations have been made, e.g. more than 19 cancellations, then control passes on branch 604 to state 606 in which an error tone is played. The DSP then plays warning messages 0098, 0292, and 0139, and then branches state 1000 in which the subscriber is disconnected from the VMS. If fewer than 19 cancellations have occurred then a warning message 0350 is played and control is passed back to state 710 to enable the subscriber to try again.

If no digits were received before the "*", then control is usually passed to state 700 to receive entry of a spoken password. If too many prior cancellations have been made, e.g. more than 19 cancellations, then control passes on branch 612 to state 614 in which an error tone is played. The DSP then plays warning messages 0098, 0292, and 0139, and then branches state 1000 in which the subscriber is disconnected from the VMS.

State 578 is reached when a timeout occurs, i.e. no response is sensed in state 701 for a predetermined period of time such as five seconds. In state 578 the DSP tests whether any DTMF digits were received before the timeout and also whether two previous timeouts have occurred. If two previous timeouts have occurred then control is passed on branch 620 in which the DSP plays warning messages 0292 and 0139. Then the subscriber is disconnected in state 1000. If no digits were received then control passes on branch 618 back to state 710, causing the DSP to prompt the subscriber to enter a mailbox ID again. If one or more digits were received before the timeout then control passes on branch 616 in which the DSP plays warning message 0178 and then returns to state 711 to wait for entry of a new mailbox ID.

This concludes description of the alternate embodiment of spoken password enrollment.

4. Enroll Recipient's Name and Word STOP Mode (Preferred Embodiment)

Referring again to FIG. 6a, if the test of block 640 is true then the enroll recipient's name and word mode begins with calibration at block 670. Blocks 670 to 676 correspond directly to blocks 650 to 656 of the enroll password mode and preferably use the same functions as the enroll password mode. After calibration and receipt of a YES/ready response, in block 678 the DSP plays a "stop" prompt such as "please say STOP after each tone." In block 680 the word STOP is enrolled for the subscriber preferably using the "RCenroll" function. This function uses speaker dependent recognition methods to create a digitally stored template of the subscriber speaking the word STOP. The template can be stored by copying it to a word table such as a "wordTab" structure.

The loop of blocks 684 to 694 enables a subscriber to enroll a plurality of recipients' names. The number of names allowed is defined in a constant "NUM_NAMES" which preferably is five. Of course, NUM_NAMES could be larger depending on the amount of available memory in the data store. In block 684 the DSP tests whether the number of currently enrolled names ("i") is less than NUM_NAMES. If so, then in block 688 the DSP plays a speak name prompt such as "after each tone, please speak the name of a message recipient." Then the name spoken by the subscriber is enrolled preferably using an RC_enroll function, and copied to the word table in blocks 690, 692. The value of "i" is accumulated by 1 in block 694 and control returns to block 684.

After enrollment of the maximum number of names control is passed to block 686 in which the DSP saves the enrolled template in the data store and on the disk drive 38, preferably using a "closeFiles" function. Via state 4, control is passed to block 642 of FIG. 6a.

5. Review New Message Mode with Password Verification

The review new message mode 636 is shown in detail in FIGS. 7a to 7e. Before the DSP plays back stored messages, the subscriber's password is verified via blocks 700 to 712. In block 700 the DSP loads the subscriber's spoken password template by calling the "loadTemplateV" function. The subscriber's voice port is calibrated in block 702 by calling the "CalibrateV" function. In block 704 the DSP plays a "speakpw" prompt such as "please speak your password after the tone." The subscriber's spoken password is received and recorded by the DSP in block 706 using the "VP_verify" and "VP_VSTART" functions. Then the DSP tests whether the password is acceptable in block 708 by testing variable parameters returned by the VP_verify function. If the password is rejected, control passes to block 710 in which the DSP plays a "reject" message such as "your password has been rejected . . . goodbye." The verify password mode then ends at block 712 in which the DSP disconnects the subscriber and closes its voice port.

If the password is accepted then in block 714 the DSP loads a vocabulary table, in the form of a disk file stored on the disk drive 38, into memory using the "loadVocab" function. In block 716 the DSP plays a "number" prompt advising the subscriber of how many messages are currently in its mailbox, such as "you have two new messages and one saved message." In block 718 of FIG. 7b, the DSP next plays a review prompt such as "do you want to review your messages . . . please say YES or NO after the tone." In block 720 the DSP waits for a YES or NO response using the "ynRecog" function. During block 722 the DSP tests whether an excessive delay (timeout) has occurred. If so, then in block 724 the DSP plays a "timeout" message such as "you are now exiting voice mail . . . goodbye." In block 726 the DSP then disconnects the subscriber. If no timeout occurred, then in block 724 the DSP tests whether the utterance received by "ynRecog" was a word, rather than non-speech or a DTMF digit, by the statement [event->class==VP_EWORD]. If this test is false then the subscriber said something other than a word. Therefore, control passes to block 726 in which the DSP plays a repeat prompt such as "your voice has not been recognized . . . please say YES or NO again." Control is then passed back to block 720.

If YES or NO was said, two tests are done in blocks 728 and 730 to determine which word was spoken. In block 728, using the statement "event->value==0" the DSP tests whether the utterance was YES. If not, then in block 730 the DSP tests for NO. If the test of block 730 is false then in block 732 the DSP plays the "repeat" message used in block 726.

If YES was sensed then control passes to a subroutine 734 called "message1". As shown in block 736, the DSP plays back three consecutive messages comprising a message header, a person's name, and the time the message was sent. These messages are given fixed values, namely "first new message from", "Louise Jennings," and "sent at 9:15 a.m." Of course, these messages can be loaded with any desired value by the DSP at the time a subscriber records a message on the VMS. To play back the actual contents of the first message, the DSP then calls a subroutine "playRecog" having the logic of blocks 738 to 748 of FIG. 7c. During this subroutine a message is played back and during playback, the DSP senses whether the listening subscriber says STOP. If so then message playback is interrupted and the next message is played. These logical operations begin in block 738 when the DSP loads a pre-recorded speaker dependent template of the word STOP using the function "loadTemplate". This template is recorded, as described above, during enrollment of the word STOP. In block 740 the DSP calibrates the listening subscriber's voice port by calling the function "calibrateR". Then the DSP enables recognition of the word STOP by calling the functions "VP_rcog" and "VP_START" in block 742. At this point if the listening subscriber says STOP then the DSP will be able to respond by interrupting message playback. Next the DSP plays back the message in block 744 having the contents of the "message1.v" file given above. In parallel the DSP waits for an event, such as an utterance of the word STOP, by calling the function "getEv" in block 746. After playback of the message is complete, in block 748 the DSP disables STOP recognition by calling the functions "VP_vcog" and "VP_STOP." This block 748 ends subroutine playRecog and processing continues in subroutine message1 at state 9 of FIG. 7d.

Figure 7A:
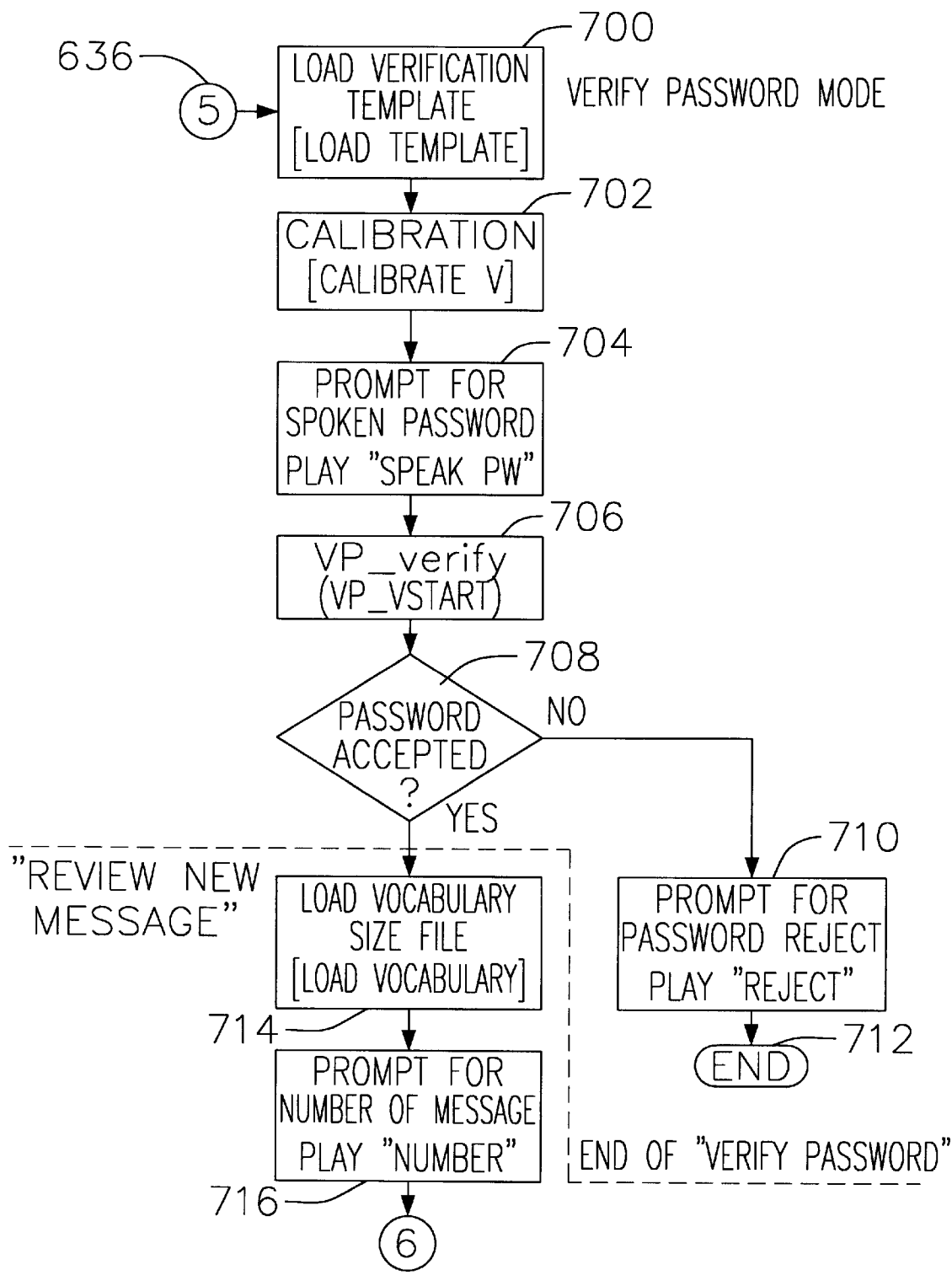
FIGS. 7a to 7d are flow diagrams of a verify password mode and a review new message mode of the preferred embodiment of the invention, including a message playback and STOP recognition mode and a YES/NO recognition mode of the preferred embodiment of the invention.
Figure 7B:
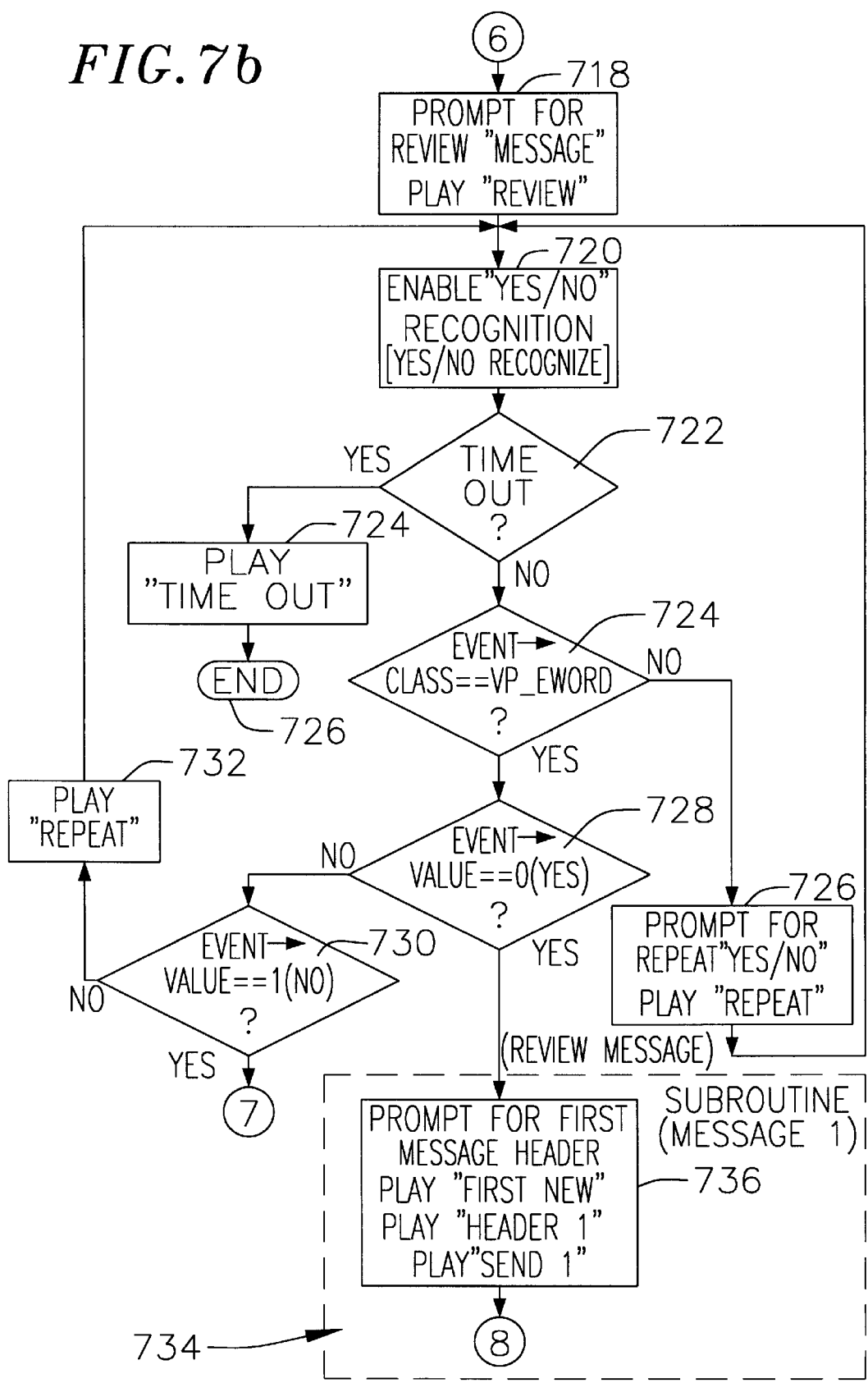
Figure 7C:
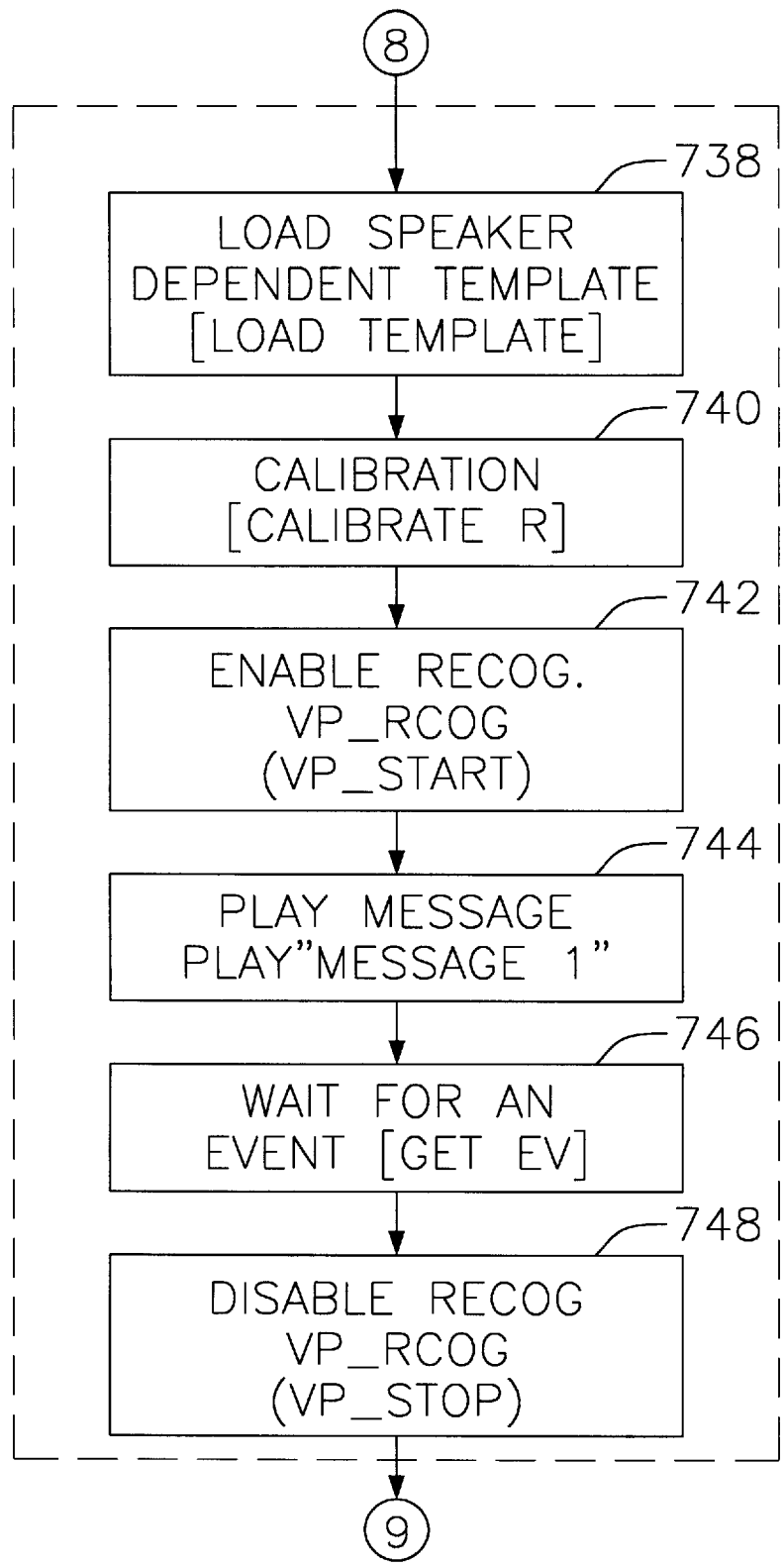
Figure 7D:
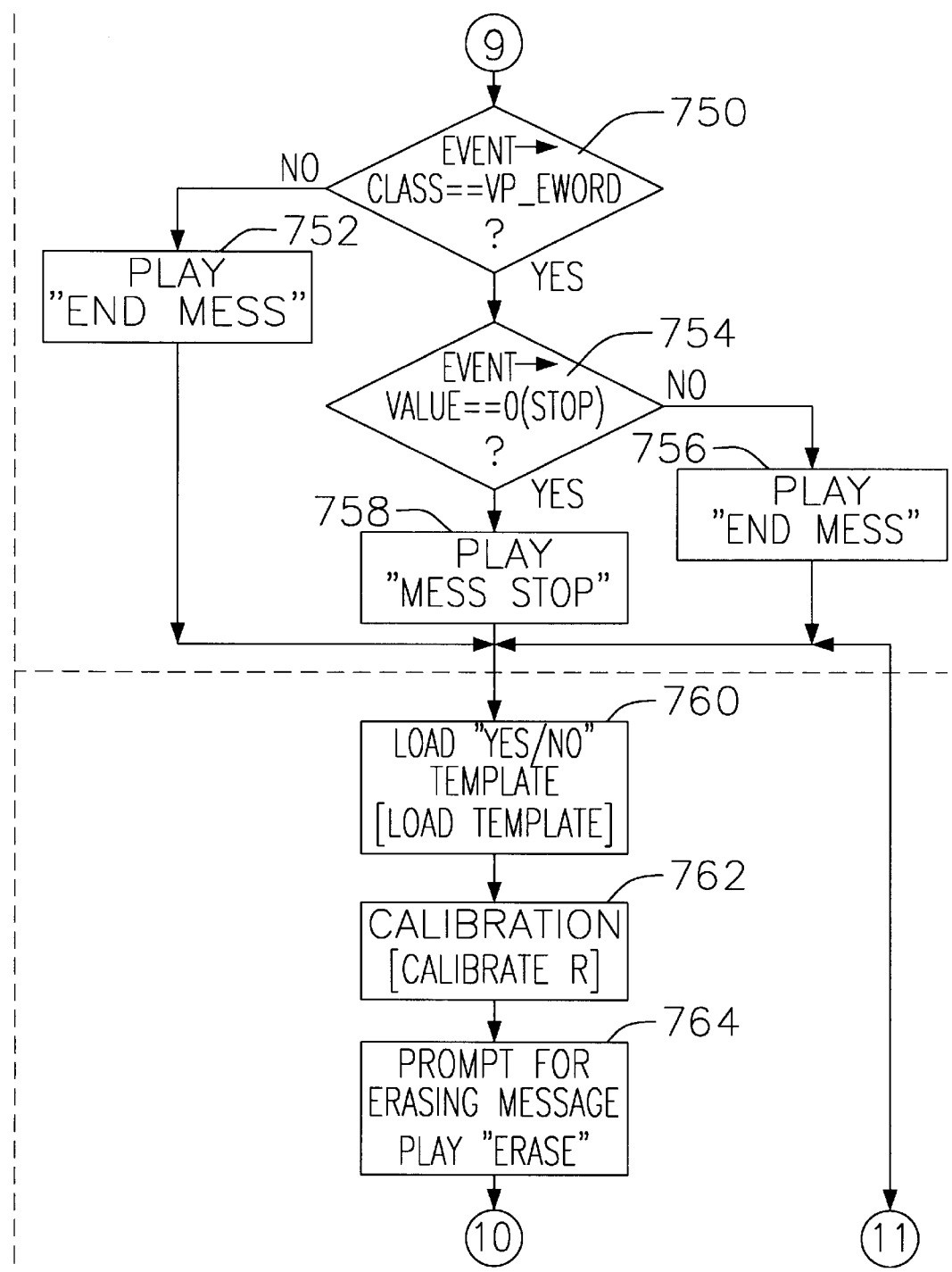

Referring now to FIG. 7d, in block 750 the DSP tests whether a word was uttered by the listening subscriber using the test "event->class==VP_EWORD". If no word was uttered then the message ended normally, so control is passed to block 752 in which the DSP plays an "endmess" message such as "end of message." If the test of block 750 is true then in block 754 the DSP tests whether the utterance was the word STOP with the test "event->value==0". If true then in block 758 the DSP plays a "messtop" message such as "message stopped."

6. Delete/Erase Message Mode

Next the subscriber is given the opportunity to erase the message which was just played. Preferably this logic occurs through a subroutine "ynRecog" and the logic of blocks 764 to 791 of FIGS. 7d and 7e. In block 760 the DSP loads a speaker independent template for the words YES and NO using the function "loadTemplate". Then in block 762 the subscriber's port is calibrated using the function "calibrateR". Next in block 764 the DSP plays an erase prompt such as "Do you want to erase this message . . . please say YES or NO after the tone."

Figure 7E:
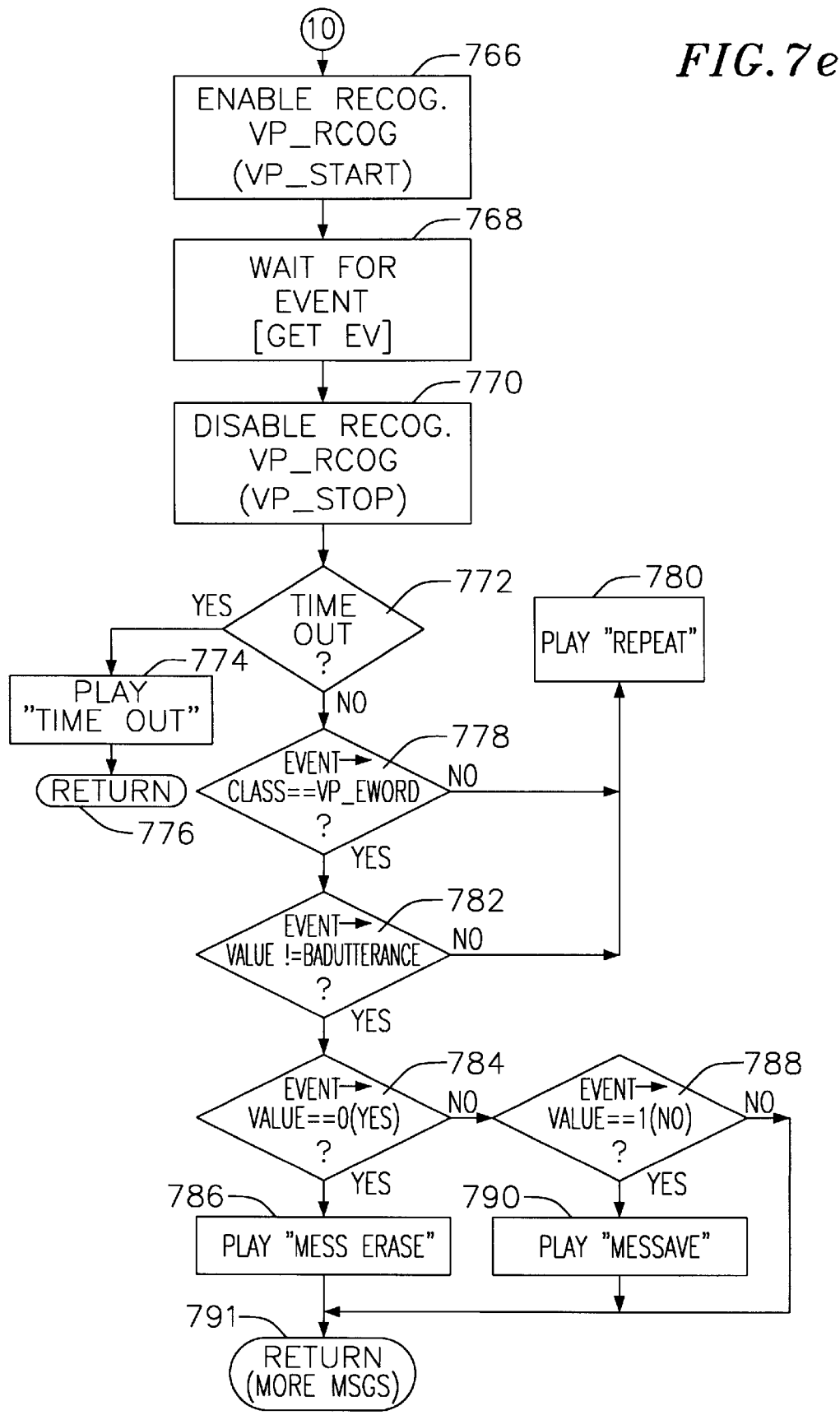

As shown in FIG. 7e, in block 766 the DSP next enables recognition of YES or NO by calling the function "VP_rcog". The DSP waits for an utterance using the function "getEv" of App. B in block 768. After an receiving an event, which can be an utterance, a DTMF digit, or a timeout, in block 770 the DSP disables YES/NO recognition using the "VP_rcog" and "VP_STOP" functions. In block 722 the DSP tests whether a timeout occurred. If so, then in block 774 the DSP plays the timeout message used above in enrollment mode, and returns control to message1 in block 776.

If no timeout occurred then the DSP next tests whether the subscriber said YES, NO, or some other utterance. In block 778 the DSP tests whether the subscriber spoke a word. If not, then in block 780 the DSP plays a repeat message to prompt the subscriber to repeat the utterance. Next the DSP tests whether the utterance is not recognizable as YES or NO, i.e. it is a "bad utterance." If so then the repeat message is played in block 780. Thus the test of block 784 is reached only when YES or NO has been uttered. If YES was uttered, i.e. the test of block 784 is true, then the DSP plays a confirming message such as "message erased." If NO was uttered, i.e. the test of block 784 is false and the test of block 788 is true, then the DSP plays a confirming message such as "message saved."

Processing of the subscriber's first new message is thus complete. If further new messages exist in a subscriber's message queue, then as indicated by block 791, the DSP plays the next new message and repeats blocks 736 to 790 as described above. In such a case the subroutine "message1" would play back the next message in the queue rather than the specific message content described above.

7. Review Saved Messages Mode

Figure 8A:
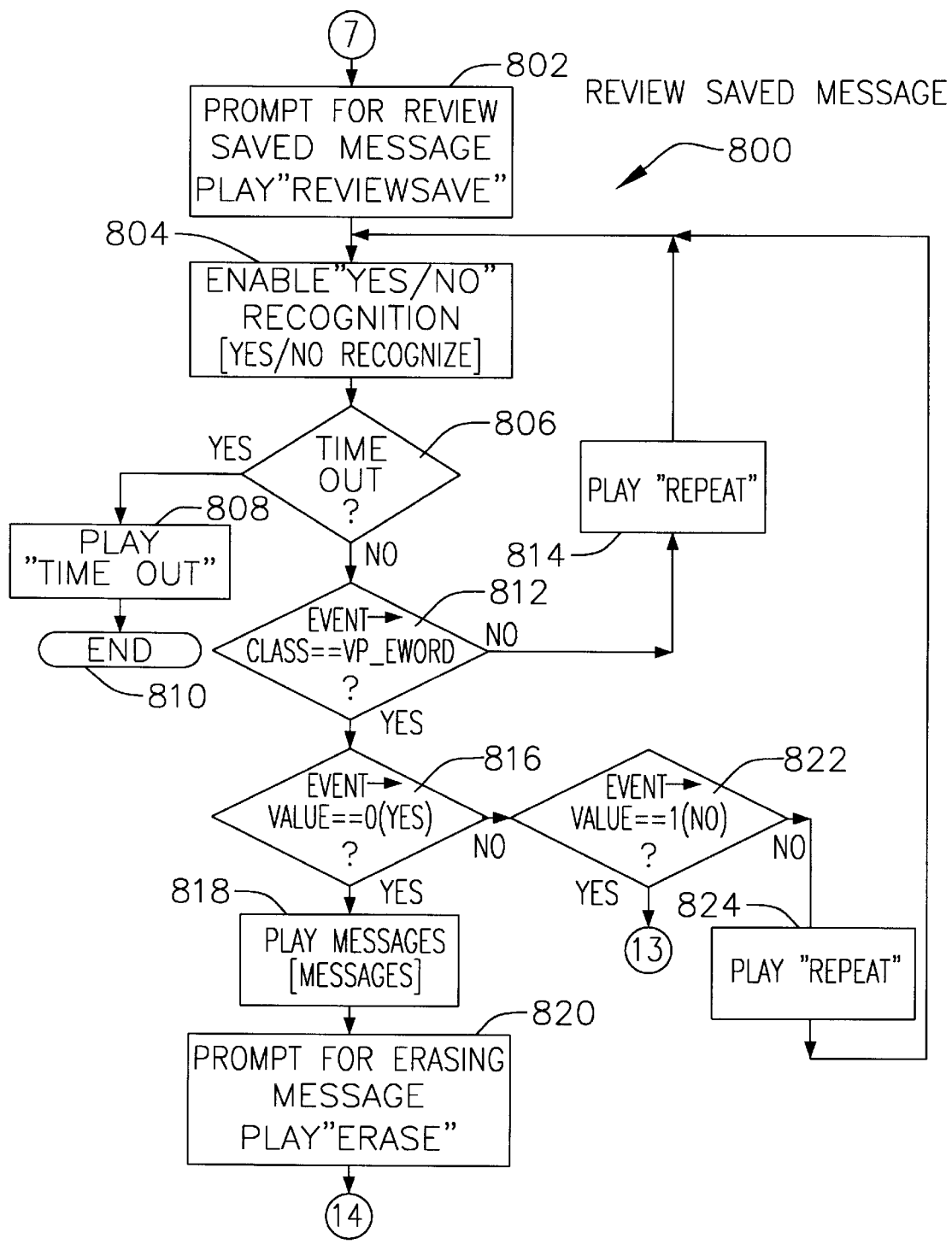
FIGS. 8a to 8b are flow diagrams of a review saved message mode of the preferred embodiment of the invention.

The subscriber is next allowed to review previously saved messages using a review saved message routine 800 of FIG. 8a. As shown in FIG. 7b, the review saved message routine can also be reached from block 730 of FIG. 7b. In block 802 of FIG. 8a, the DSP plays a review prompt such as "do you want to review your saved messages . . . please say YES or NO after the tone." In block 804 the DSP waits for a YES or NO response using the "ynRecog" function. During block 806 the DSP tests whether timeout has occurred. If so, then in block 808 the DSP plays a "timeout" message such as "you are now exiting voice mail . . . goodbye." In block 810 the DSP then disconnects the subscriber. If no timeout occurred, then in block 812 the DSP tests whether the utterance received by "ynRecog" was a word, rather than non-speech or a DTMF digit, by the statement [event->class==VP_EWORD]. If this test is false then the subscriber said something other than a word. Therefore, control passes to block 814 in which the DSP plays a repeat prompt such as "your voice has not been recognized . . . please say YES or NO again." Control is then passed back to block 804.

If YES or NO was said, two tests are done in blocks 816 and 822 to determine which word was spoken. In block 816, the DSP tests whether the utterance was YES. If not, then in block 822 the DSP tests for NO. If the test of block 822 is false then in block 824 the DSP plays the "repeat" message. If YES was sensed then in block 818 the saved message is played. This is done by a subroutine called "message3". Thus the processing of FIG. 8a blocks 802 to 818 is similar to blocks 718 to 736 of FIG. 7b.

8. Delete/Erase Saved Message Mode

The subscriber is next given the opportunity to erase a saved message. This is done in the logic of blocks 820 to 840 of FIGS. 8a and 8b. The logic of these blocks is not described in detail herein since these blocks correspond to blocks 764 to 790 of FIGS. 7d and 7e, as shown in Table 3.

TABLE 3

Erase Message Logic Corresponding States

Figure 8B:
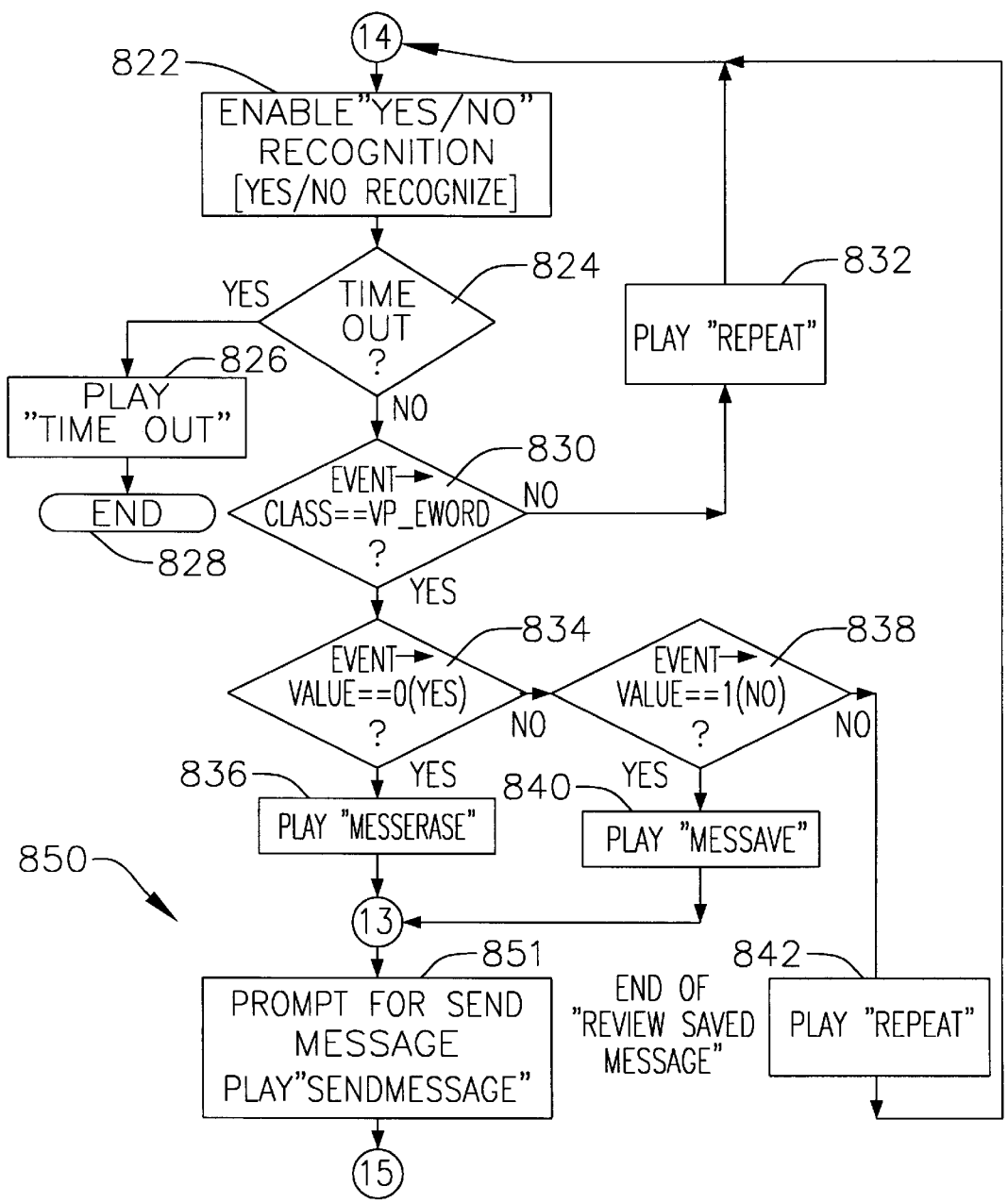
Figure 8C:
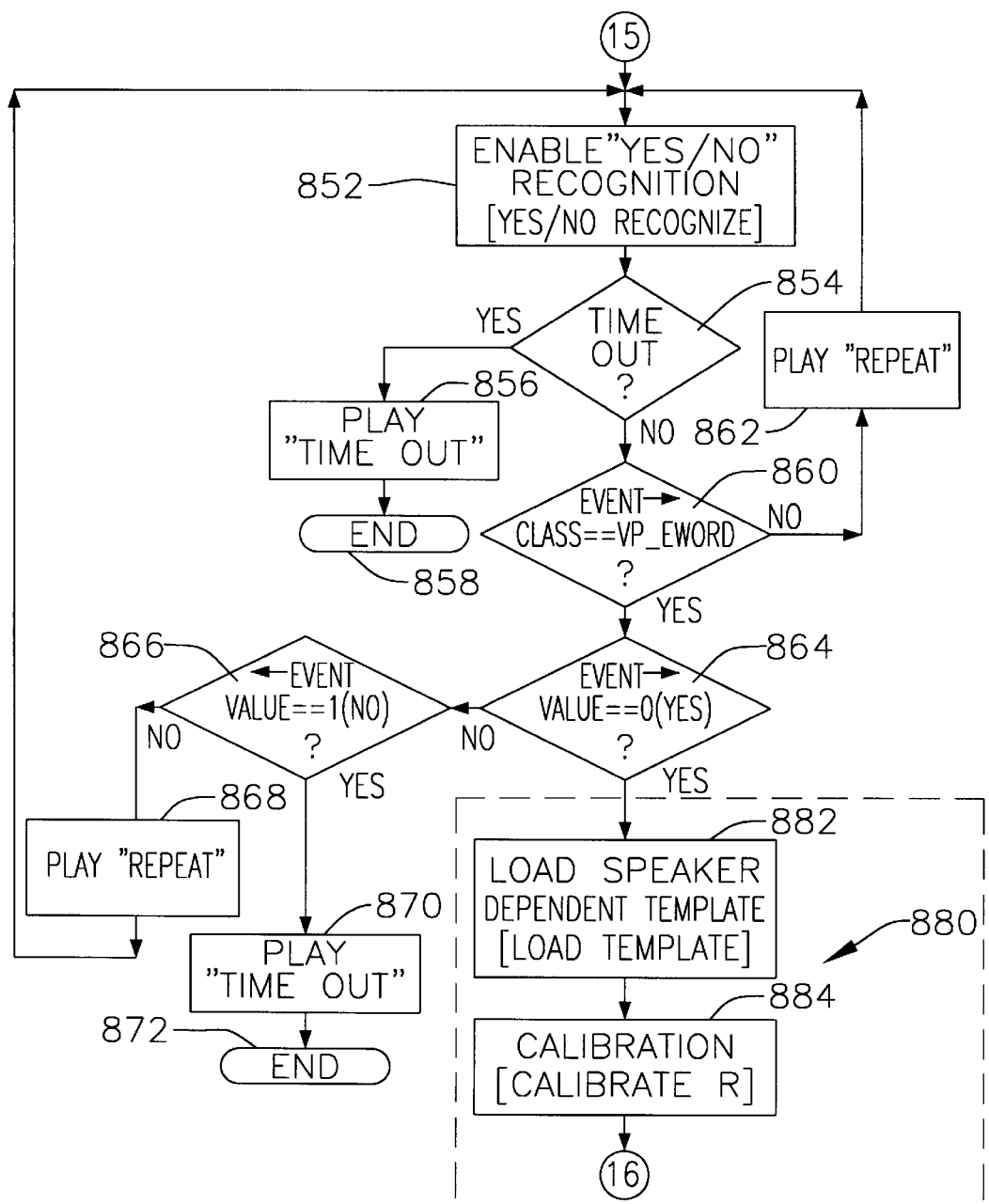

| FIG. 7d/7e | FIG. 8a/8b | FIG. 8c |
|---|---|---|
| 764 | 820 | 851 |
| 766, 768, 770 | 822 | 852 |
| 772 | 824 | 854 |
| 774 | 826 | 856 |
| 776 | 828 | 858 |
| 778 | 830 | 860 |
| 780 | 832 | 862 |
| 782 | — | — |
| 784 | 834 | 864 |
| 786 | 836 | — |
| 788 | 838 | 866 |
| 790 | 840 | 870 |
| — | 842 | 868 |

However, as shown in FIG. 8b, in block 842 the subscriber is prompted to repeat an utterance if neither YES nor NO were recognized. This ensures that previously saved messages are erased whenever possible. Processing of saved messages ends at state 13 of FIG. 8b. In an alternate embodiment the VMS can provide a queue of saved messages on the disk drive 38, and provide means for processing more messages in the queue at state 13. For example, state 13 could be replaced with subroutine return logic to cause the DSP to repeat blocks 802 to 842 for each saved message in the queue.

9. Send Message Mode

The subscriber is next given a chance to send a message to another subscriber, called the "receiving subscriber", in a send message routine 850 of FIGS. 8b and 8c. In block 851 the DSP plays a send message prompt such as "do you want to send a message . . . please say YES or NO after the tone." In blocks 852 to 872 the DSP then processes a YES or NO utterance. The logic of blocks 852 to 872 corresponds generally to blocks 804 to 824 of FIG. 8a, as shown above in Table 3.

Figure 8D:
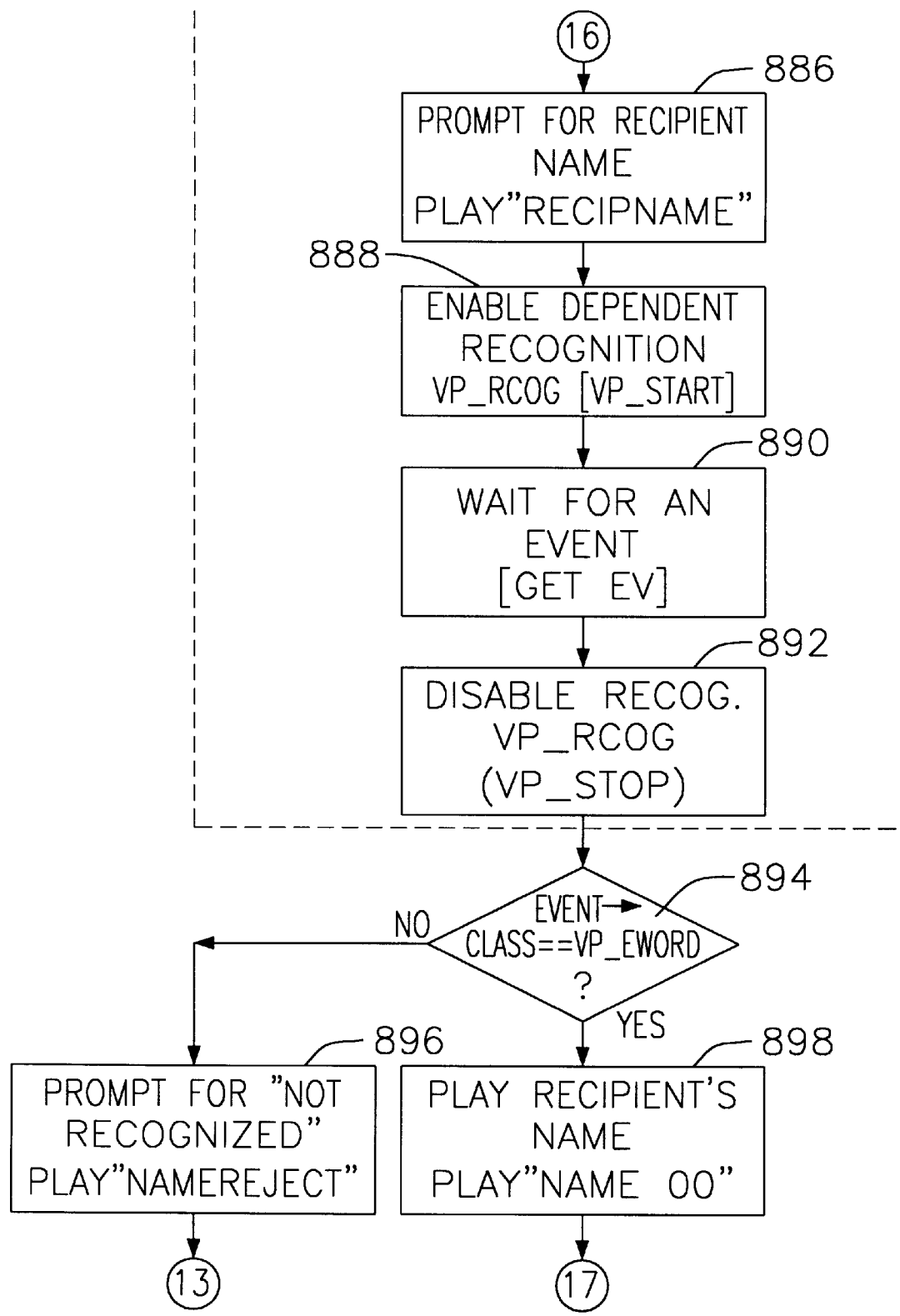

If a YES is uttered, i.e. the test of block 864 is true, then the DSP enters a subroutine 880 called "nameRecog" using the logic of FIGS. 8c and 8d. In block 882 the DSP loads speaker dependent templates of message recipients' names, using the "loadTemplate" function. These templates are pre-recorded by a subscriber in the name enrollment mode described above. Then the DSP calibrates the sending subscriber's voice port by calling the "calibrateR" function. The DSP next plays a "recipname" prompt to the sending subscriber, such as "please say the recipient's name after the tone." In block 888 the DSP enables speaker dependent recognition by calling the "VP_rcog" and VP_START functions. Then the DSP waits for an event, such as a spoken utterance or timeout, in block 890 by calling "getEv". When an event occurs the DSP disables recognition in block 892 by calling "VP_rcog" and VP_STOP. In block 894 the DSP tests whether the event was a word. If not, then in block 896 the DSP plays a "namereject" prompt such as "the recipient's name has not been recognized." Then control is transferred via state 13 to block 851 to enable the subscriber to try again. If the test of block 894 is true then in block 898 the DSP plays the recipient's name. In the embodiment described herein this is done by playing the content of a "name00" voice file. In an alternate embodiment, the test of block 894 is supplemented with an additional test to match the sending subscriber's utterance to one of several digitally stored templates for different recipients' names. This matching can be carried out in a manner similar to the speaker dependent spoken password verification methods described below. Then the matched name is played back in block 898.

The sending subscriber then is allowed to record a message to be sent in blocks 900 to 906. In block 900 the DSP plays a record message prompt such as "please record your message after the tone." In block 902 the DSP records the voice of the sending subscriber in a message file on the disk drive 38 by calling the function "VC_record." This function is one of a plurality of voice primitive functions in a file "VC.h" commercially available from Digital Sound Corp. Any known method of digitally recording a subscriber's voice can be used in block 902. In block 904 the DSP prompts the sending subscriber with a review prompt such as "Do you wish to review your message . . . please say YES or NO after the tone." In block 906 the DSP waits for an utterance by the sending subscriber and tests whether the utterance is YES or NO.

Figure 9A:
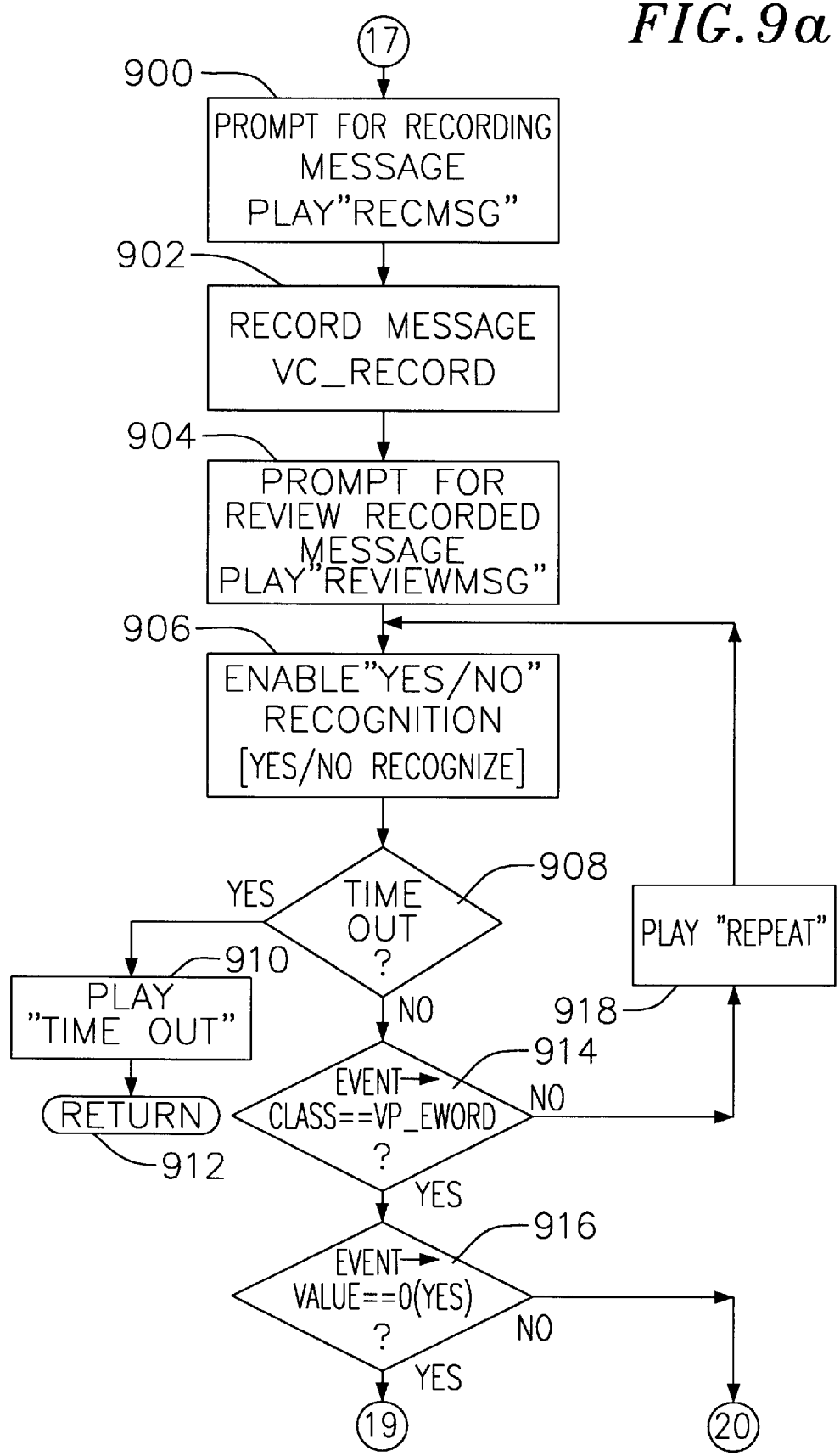
Figure 9B:
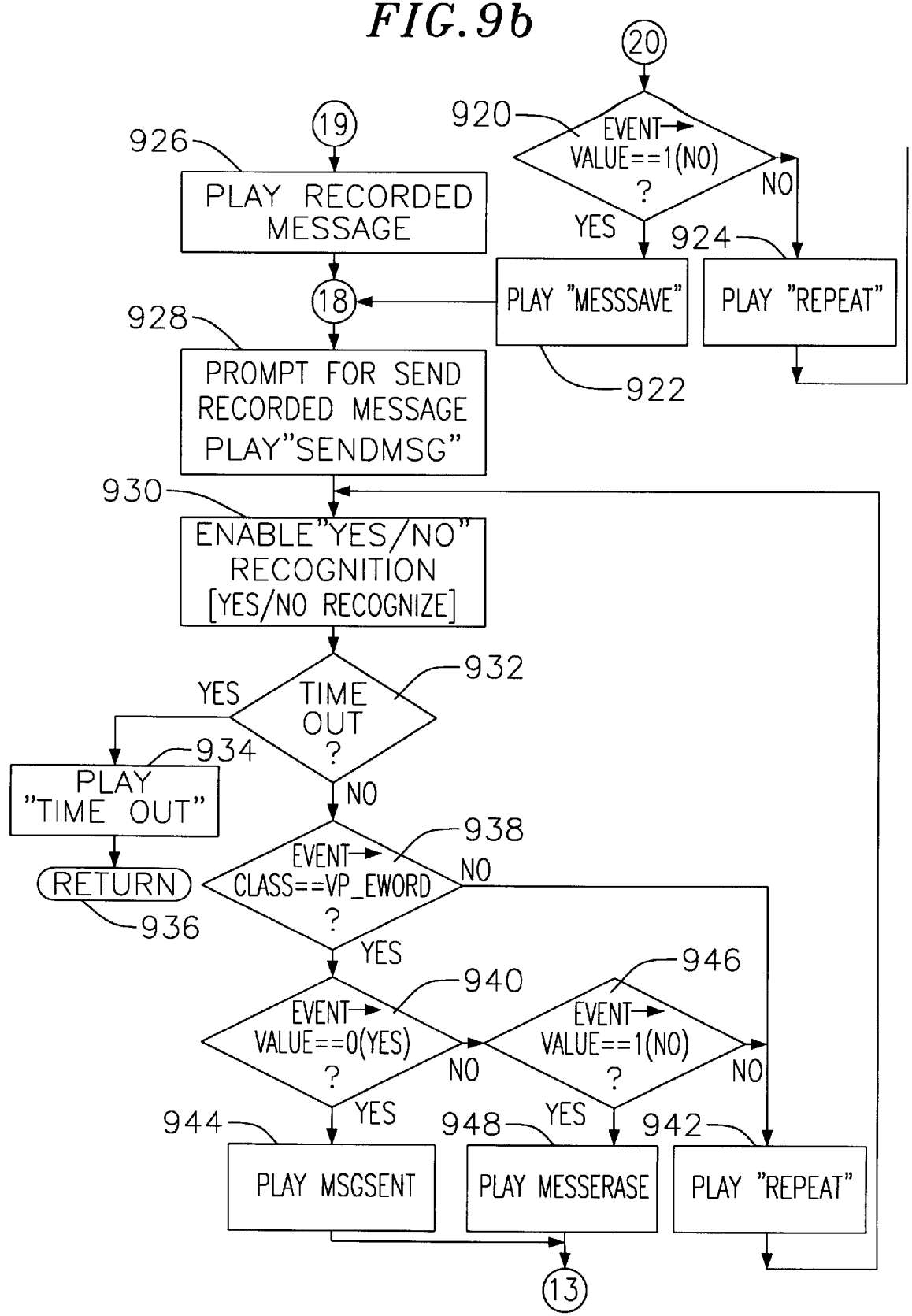

The YES/NO recognition processing of blocks 906 to 918 is implemented using logical steps similar to those described above for other YES/NO processing. As shown in FIG. 9b, if a NO utterance is detected, then in block 922 the DSP plays a confirming message such as "message saved" to advise the sending subscriber that the message has been recorded and saved. Using processing steps known in the art, the saved message is stored in association with means for recipient identification to enable the receiving subscriber to obtain the message. For example, the saved message can be tagged with the recipient's mailbox id or added to the recipient's message queue. If a YES utterance is detected in block 916, then in block 926 the DSP plays back the recorded message.

Referring again to FIG. 9b, the sending subscriber is then allowed to choose whether or not to send the message in the logical steps starting at block 928. In block 928 the DSP plays a send message prompt such as "Do you wish to send your message . . . please say YES or NO after the tone." In steps 930 to 946 the DSP tests whether a YES or NO is uttered using logic similar to the YES/No processing described above. If a YES is detected then in block 944 the DSP plays a confirming message such as "message sent." If a NO is detected then the subscriber desires to discard the message, so in block 948 the DSP plays a confirming message such as "message erased." If the utterance cannot be identified then in block 942 the DSP plays a repeat prompt such as "response not recognized . . . please say yes or no again."

Thus, the above logic enables voice command of VMS features including message playback, message sending, message saving, deletion, and reviewing. The invention also enables a subscriber to control message playback by saying STOP during playback.

10. Other Features and Processing Modes

In the preferred embodiment, the following speaker verification parameters are configurable: sensitivity threshold, number of enrollment iterations, and maximum silence duration. Preferably the parameters are implemented using constants. Configurability is done by changing the constants and re-compiling the program.

In the preferred embodiment the use of a password can be enabled and disabled, i.e. turned on and off, by a subscriber using DTMF commands. When spoken password service is turned off, the template is preferably retained by storage on a mass storage device such as disk drive 38.

Preferably the VMS includes means for universal password entry, by which a subscriber can enter either a spoken password or a DTMF keypress password, without first telling the VMS which type of password will be used. Also in the preferred embodiment, the spoken password feature employs an ordinary telephone microphone and operates in real time. Preferably the amount of memory storage for a template is low, allowing the system to store templates for a large number of subscribers. In one preferred embodiment a template can be stored in about 1100 bytes per subscriber per template.

In an alternative embodiment, the VMS can further comprise an adaptive template capability whereby a subscriber's template is modified to incorporate new information each time the subscriber accomplishes mailbox login after password verification. One possible application is when the subscriber has laryngitis, a head cold or other impairment which renders the subscriber unable to properly match the template. An adaptive template capability also precludes the need for the subscriber to change the template when line conditions change. This can occur when the subscriber acquires a new telephone set or moves to a different office. Adaptive template capability also causes the password template to become more accurate as the subscriber uses it more often.

In another alternative embodiment, the VMS comprises means for multiple template entry, enabling a subscriber to record a template from each telephone he expects to use to gain access to his mailbox. For example, a subscriber could record templates from his office phone, car phone, and home phone, each of which would have different characteristics. The VMS would select the correct template using the calling party ID. Moreover, in an alternative embodiment, the VMS can comprise means for storing a plurality of confidence levels, each confidence level being associated with a different template. This would improve performance at each different phone location.

Preferably the spoken password is both recorded digitally and encoded using a secure encoding template. The encoding template, discussed in detail below, uses a combination of linear predictive coding (LPC) and cepstral coefficients. Using this template, the user password cannot be decoded if it is intercepted by an unauthorized listener.

Thus, the invention provides numerous advantages over the prior art. A spoken password is superior to a DTMF password because use of a DTMF password always enables imposters to access subscriber mailboxes. Spoken password access is easier and usually faster than entry of a DTMF password, and allows hands free control of a VMS.

The invention may be practiced in many ways other than as specifically described herein. For example, different quantities of taps can be used in the buffering functions depending on the desired degree of spike resistance. In an alternative embodiment, the VMS can include means for secure login in which both a DTMF password and a spoken password must be entered to gain access to a subscriber mailbox. In yet another alternative embodiment, the VMS can include means for configurable response, by which a subscriber can specify whether a password should comprise spoken password only, DTMF password only, spoken OR DTMF, and no password.

Thus, the invention should be given the full scope of the appended claims:

What is claimed is:

1. A voice controlled digital voice messaging system comprising:
    at least one subscriber telephone line coupled to a line interface controller means for digitizing voice signals received on the telephone line;
    a mass storage device having a plurality of digitized voice prompts recorded thereon;

signal processing means coupled to a memory and to the line interface controller means and to the mass storage device for controlling storage, retrieval, playback, and sending of voice messages, comprising means for selecting verification data responsive to an identification of the said at least one subscriber telephone line;

means for controlling access of a subscriber to the system upon verification of a spoken password of the subscriber using said selected verification data;

means for control of playback of voice messages stored on the mass storage device, comprising means for interrupting playback when the subscriber speaks a voice command during playback;

means for control of storage, retrieval, playback, and sending of voice messages in response to affirmative or negative voice commands given by the subscriber; and means for directing messages to one of a plurality of intended message recipients, the intended recipient being identified by a spoken utterance by the subscriber of the name of the intended recipient.

2. The system of claim 1 wherein the means for controlling access to the system comprises means for speaker dependent recognition of a stored subscriber password and means for granting access to the system when the stored subscriber password is recognized.

3. The system of claim 1 wherein the means for control of playback comprises means for speaker dependent recognition of an interrupt command during playback, and means for interrupting playback of a message in response to speaker dependent recognition of the interrupt command.

4. The system of claim 1 wherein the means for control of storage comprises means for speaker independent recognition of YES or NO commands, and means for interrupting saving, erasing, replaying, and sending a message in response to speaker independent recognition of the YES or NO commands.

5. The system of claims 2, 3, or 4 wherein each means for recognition includes means for rejection of out-of-vocabulary utterances by the subscriber.

6. The system of claim 1 wherein the means for controlling access to the system further comprises means for enrollment of a speaker dependent password template, the template comprising a digital representation of features of a spoken password signal provided by the subscriber.

7. The system of claim 6 wherein the means for enrollment further comprises means for receiving a first plurality of spoken password utterances from the subscriber, means for creating the template based on a second plurality of the utterances comprising a first subset of the first plurality, and means for testing the template by comparing a third plurality of the utterances, comprising a second subset of the first plurality, to the template.

8. The system of claim 1, wherein the means for control of playback of voice messages stored on the mass storage device, comprises means for enrolling the word STOP spoken by the subscriber and means for recognition of the utterance STOP by the subscriber.

9. The system of claim 8 wherein the means for enrolling the word STOP further comprises means for receiving a first plurality of input spoken utterances from the subscriber, means for creating a template based on a second plurality of the utterances comprising a first subset of the first plurality, and means for testing the template by comparing a third plurality of the utterances, comprising a second subset of the first plurality, to the template.

10. The system of claim 1 wherein the means for control of storage, retrieval, playback and sending of voice messages further comprises means for speaker independent recognition of utterances of YES and NO.

11. The system of claim 1 wherein the means for control of storage, retrieval, playback and sending of voice messages further comprises:

means for prompting the subscriber to select a play message mode for playing messages stored on the mass storage device;

means for recognition of affirmative and negative utterances by the subscriber; and means responsive to an affirmative utterance for playing back a stored message.

12. The system of claim 1 wherein the means for control of storage, retrieval, playback and sending of voice messages further comprises:

means for prompting the subscriber to select a save message mode for saving messages recently stored on the mass storage device;

means for recognition of affirmative and negative utterances by the subscriber; and means responsive to an affirmative utterance for saving a recently received stored message on the mass storage device.

13. The system of claim 1 wherein the means for control of storage, retrieval, playback and sending of voice messages further comprises:

means for prompting the subscriber to select an erase message mode for erasing messages recently stored on the mass storage device;

means for recognition of affirmative and negative utterances by the subscriber; and means responsive to an affirmative utterance for erasing a recently received message from the mass storage device.

14. The system of claim 1 wherein the means for control of storage, retrieval, playback and sending of voice messages further comprises:

means for prompting the subscriber to select a review saved message mode for replaying messages previously stored on the mass storage device by the subscriber;

means for recognition of affirmative and negative utterances by the subscriber; and means responsive to an affirmative utterance for replaying a message stored on the mass storage device.

15. The system of claim 1 wherein the means for control of storage, retrieval, playback, and sending of voice messages further comprises:

means for prompting the subscriber to select an erase saved message mode for erasing a message stored on the mass storage device by the subscriber in the save message mode;

means for recognition of affirmative and negative utterances by the subscriber; and means responsive to an affirmative utterance for erasing a saved message from the mass storage device.

16. The system of claim 1 wherein the means for control of storage, retrieval, playback, and sending of voice messages further comprises:

means for prompting the subscriber to select a send message mode for sending messages from the subscriber to one of a plurality of intended message recipients;

means, responsive to the means for prompting the subscriber, for sending messages from the subscriber to one of the plurality of intended message recipients, comprising:

means for recognition of the name of an intended message recipient; and means for recording a digitized voice message to the intended recipient on the mass storage device.

17. The system of claim 16, wherein the means for sending messages from the subscriber further comprises means for selectively replaying the voice message upon speaker independent recognition of a YES utterance from the subscriber.

18. The system of claim 16 wherein the means for sending messages further comprises means for enrolling a plurality of speaker dependent templates representing digitized utterances of a plurality of names of intended message recipients.

19. The system of claim 9 wherein the template is created using a hidden Markov model having at least fourteen states and having cepstral coefficients of at least twentieth order.

20. The system of claim 19 wherein the means for testing the template comprises means for measuring spectral distance using smoothed Laplacian group delay spectrum.

21. The system of claim 19 wherein the means for testing the template comprises means for weighting the cepstral coefficients using smoothed group delay.

22. The system of any of claims 8, 10, 11, 12, 13, 14, 15, 16, or 17 wherein the means for recognition comprises means for creating a digital template and means for comparing the digital template to the spoken password of the subscriber, the template representing an earlier measured utterance of the password by the subscriber, using a hidden Markoff model, having at least 14 states and having cepstral coefficients of at least 20th order.

23. The system of claim 22 wherein the means for comparing the template comprises means for measuring spectral distance using smoothed Laplacian group delay spectrum.

24. The system of claim 23 wherein the means for comparing the template comprises means for weighting the cepstral coefficients using smoothed group delay.

25. In a data processing system having at least one subscriber telephone line coupled to a line interface controller for digitizing voice signals received on the telephone line, a mass storage device having a plurality of digitized voice prompts recorded thereon, and signal processing means coupled to a memory and to the line interface controller and to the mass storage device;

a method for controlling storage, retrieval, playback, and sending of voice messages, comprising the steps of:
identifying the at least one subscriber telephone line;
selecting verification data responsive to said identification;
providing access to the system in response to verification of a spoken password uttered by a subscriber, said verification using the selected verification data;
selectively playing back voice messages stored on the mass storage device, comprising the substep of interrupting playback in response to an utterance by the subscriber of a voice command during playback;
controlling storage, retrieval, playback and sending of voice messages in response to utterances of affirmative or negative voice commands by the subscriber; and
selectively sending messages to one of a plurality of intended message recipients, the intended recipient being identified by a spoken utterance by the subscriber of the name of the intended recipient.

26. The method of claim 25 wherein the step of providing access to the system further comprises the step of recording a speaker dependent password template, the template comprising a digital representation of features of a spoken password signal provided by the subscriber.

27. The method of claim 26, wherein the step of providing access to the system further comprises the steps of comparing the template to a second template formed from an utterance by the subscriber, determining whether the templates match, and in response to a template match, granting access to the system.

28. The method of claim 25 wherein the affirmative utterance is YES and the negative utterance is NO.

29. The method of claim 25 wherein the step of providing access to the system further comprises the steps of:
receiving a first plurality of input spoken password utterances from the subscriber,
creating a template based on a second plurality of the utterances comprising a first subset of the first plurality,
testing the template by comparing a third plurality of the utterances, comprising a second subset of the first plurality, to the template,
and in response to the testing step, rejecting the template if the third plurality of utterances do not match the template.

30. The method of claim 25, wherein the step of selectively playing back voice messages stored on the mass storage device, includes the substep of enrolling an interrupt command word spoken by the subscriber.

31. The method of claim 30, wherein the interrupt command word is STOP.

32. The method of claim 25, wherein the step of controlling storage, retrieval, playback, and sending includes the substep of enrolling an interrupt command word spoken by the subscriber.

33. The method of claim 32, wherein the interrupt command word is STOP.

34. The method of claims 30 or 32 wherein the substep of enrolling the interrupt command word further comprises the steps of:
receiving a first plurality of input spoken password utterances from the subscriber,
creating a template based on a second plurality of the utterances comprising a first subset of the first plurality,
testing the template by comparing a third plurality of the utterances, comprising a second subset of the first plurality, to the template,
and in response to the testing step, rejecting the template if the third plurality of utterances do not match the template.

35. The method of claim 25 wherein the step of controlling storage, retrieval, playback, and sending of voice messages further comprises the step of speaker independent recognition of affirmative or negative command utterances.

36. The method of claim 25 wherein the step of controlling storage, retrieval, playback and sending of voice messages further comprises the steps of:
prompting the subscriber to select a play message mode for playing messages stored on the mass storage device;
recognition of affirmative or negative utterances by the subscriber; and
responding to an affirmative utterance by playing back a stored message.

37. The method of claim 36 wherein the step of recognition further comprises the step of rejecting out-of-vocabulary utterances.

38. The method of claim 25 wherein the step of controlling storage, retrieval, playback and sending of voice messages further comprises the steps of:

prompting the subscriber to select a save message mode for saving messages recently stored on the mass storage device;

recognition of affirmative or negative command utterances by the subscriber; and responding to an affirmative utterance for saving a recently received stored message on the mass storage device.

39. The method of claim 25 wherein the step of controlling storage, retrieval, playback, and sending of voice messages further comprises the steps of:

prompting the subscriber to select an erase message mode for erasing messages recently stored on the mass storage device;

recognition of affirmative or negative utterances by the subscriber; and responding to an affirmative utterance by erasing a recently received message from the mass storage device.

40. The method of claim 25 wherein the step of controlling storage, retrieval, playback, and sending of voice messages further comprises:

prompting the subscriber to select a review saved message mode for replaying messages previously stored on the mass storage device by the subscriber;

recognition of affirmative or negative utterances by the subscriber; and responding to an affirmative utterance for replaying a message stored on the mass storage device.

41. The method of claim 25 wherein the step of controlling storage, retrieval, playback and sending of voice messages further comprises the steps of:

prompting the subscriber to select an erase saved message mode for erasing messages stored on the mass storage device by the subscriber in the save message mode;

recognition of affirmative or negative utterances by the subscriber; and responding to an affirmative utterance by erasing a saved message from the mass storage device.

42. The method of claim 25 wherein the step of controlling storage, retrieval, playback and sending of voice messages further comprises the steps of:

prompting the subscriber to select a send message mode for sending messages from the subscriber to one of a plurality of intended message recipients;

recognition of affirmative or negative utterances by the subscriber;

responding to an affirmative utterance for sending messages from the subscriber to one of the plurality of intended message recipients, comprising the steps of:

recognition of the name of an intended message recipient spoken by the subscriber; and recording a digitized voice message of the subscriber to the intended recipient on the mass storage device.

43. The method of claim 42, wherein the step of responding to an affirmative utterance further comprises the substeps of prompting the subscriber whether to replay the message, and selectively replaying the message upon recognition of an affirmative utterance from the subscriber.

44. The method of claim 25 further comprising the step of enrolling a plurality of speaker dependent templates representing digitized utterances of a plurality of names of intended message recipients prior to the step of sending messages.

45. The method of claim 44 wherein the speaker dependent templates are created using a hidden Markov model having at least fourteen states and having cepstral coefficients of at least twentieth order.

46. The method of claim 45 further comprising testing the speaker dependent templates by measuring spectral distance using smoothed group delay spectrum.

47. The method of claim 45 further comprising testing the speaker dependent templates by weighting the cepstral coefficients using smoothed group delay.

48. A voice controlled digital voice messaging system comprising:

at least one subscriber telephone line coupled to a line interface controller means for digitizing voice signals received on the telephone line;

a mass storage device having a plurality of digitized voice prompts recorded thereon;

signal processing means coupled to a memory and to the line interface controller means and to the mass storage device for controlling storage, retrieval, playback, and sending of voice messages, comprising means for selecting verification data responsive to an identification of the said at least one subscriber telephone line;

means for controlling access of a subscriber to the system upon verification of a spoken password of the subscriber using said selected verification data;

means for control of playback of voice messages stored on the mass storage device, comprising means for interrupting playback when the subscriber speaks a voice command during playback; and means for directing messages to one of a plurality of intended message recipients, the intended recipient being identified by a spoken utterance by the subscriber of the name of the intended recipient.

49. The system of claim 18 wherein the speaker dependent templates are created using a hidden Markov model having at least fourteen states and having cepstral coefficients of at least twentieth order.

* * * * *